United States Patent
Kuroda et al.

(10) Patent No.: US 10,284,091 B2
(45) Date of Patent: May 7, 2019

(54) BI-DIRECTIONAL CONVERTER, CONTROLLER, AND SEMICONDUCTOR DEVICE

(71) Applicant: PANASONIC INTELLECTUAL PROPERTY MANAGEMENT CO., LTD., Osaka (JP)

(72) Inventors: Keisuke Kuroda, Osaka (JP); Takashi Ryu, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/677,913

(22) Filed: Aug. 15, 2017

(65) Prior Publication Data

US 2017/0346401 A1    Nov. 30, 2017

Related U.S. Application Data

(63) Continuation of application No. PCT/JP2016/000804, filed on Feb. 17, 2016.

(30) Foreign Application Priority Data

Feb. 26, 2015 (JP) ................. 2015-037417

(51) Int. Cl.
*H02M 3/158* (2006.01)
*H02M 1/08* (2006.01)
*H02M 1/00* (2006.01)

(52) U.S. Cl.
CPC .......... *H02M 3/1582* (2013.01); *H02M 1/08* (2013.01); *H02M 3/158* (2013.01);
(Continued)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 6,271,708 B1   8/2001 Hoshi et al.
2009/0201003 A1*  8/2009 Kobori ............... H02M 3/1582
                                                           323/284
(Continued)

FOREIGN PATENT DOCUMENTS

JP    2000-059189 A    2/2000
JP    2003-158868 A    5/2003
(Continued)

OTHER PUBLICATIONS

International Search Report and Written Opinion issued in International Patent Application No. PCT/JP2016/000804, dated Apr. 26, 2016; with partial English translation.

*Primary Examiner* — Bryan R Perez
(74) *Attorney, Agent, or Firm* — McDermott Will & Emery LLP

(57) ABSTRACT

A controller controls a bi-directional converter which includes: a first input/output terminal and a second input/output terminal for receiving and outputting a voltage stepped up by a step-up operation and a voltage stepped down by a step-down operation; a first switching element; a second switching element; and an inductor. The controller includes: a first driver which controls the first switching element via a first resistance circuit; a second driver which controls the second switching element via a second resistance circuit; and an operation mode setter which selects one of the step-up operation and the step-down operation, wherein at least one of the first resistance circuit and the second resistance circuit is a variable resistance circuit which has a resistance value that varies for the step-up operation and the step-down operation, in accordance with selection made by the operation mode setter.

11 Claims, 19 Drawing Sheets

(52) U.S. Cl.
CPC .. *H02M 3/1588* (2013.01); *H02M 2001/0003* (2013.01); *Y02B 70/1466* (2013.01)

(58) Field of Classification Search
CPC ...... H02M 3/157; H02M 3/1563; H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53
USPC .................. 327/108–110; 323/271, 280–285
See application file for complete search history.

(56) References Cited

U.S. PATENT DOCUMENTS

| | | | |
|---|---|---|---|
| 2010/0193781 A1* | 8/2010 | Tripathy | B81C 1/00484 257/43 |
| 2011/0260706 A1* | 10/2011 | Nishijima | H02M 3/157 323/311 |
| 2012/0223763 A1 | 9/2012 | Sawada | |

FOREIGN PATENT DOCUMENTS

| | | |
|---|---|---|
| JP | 2007-060853 A | 3/2007 |
| JP | 2011-199178 A | 10/2011 |
| JP | 2013-005474 A | 1/2013 |
| WO | 2010/143274 A1 | 12/2010 |

\* cited by examiner

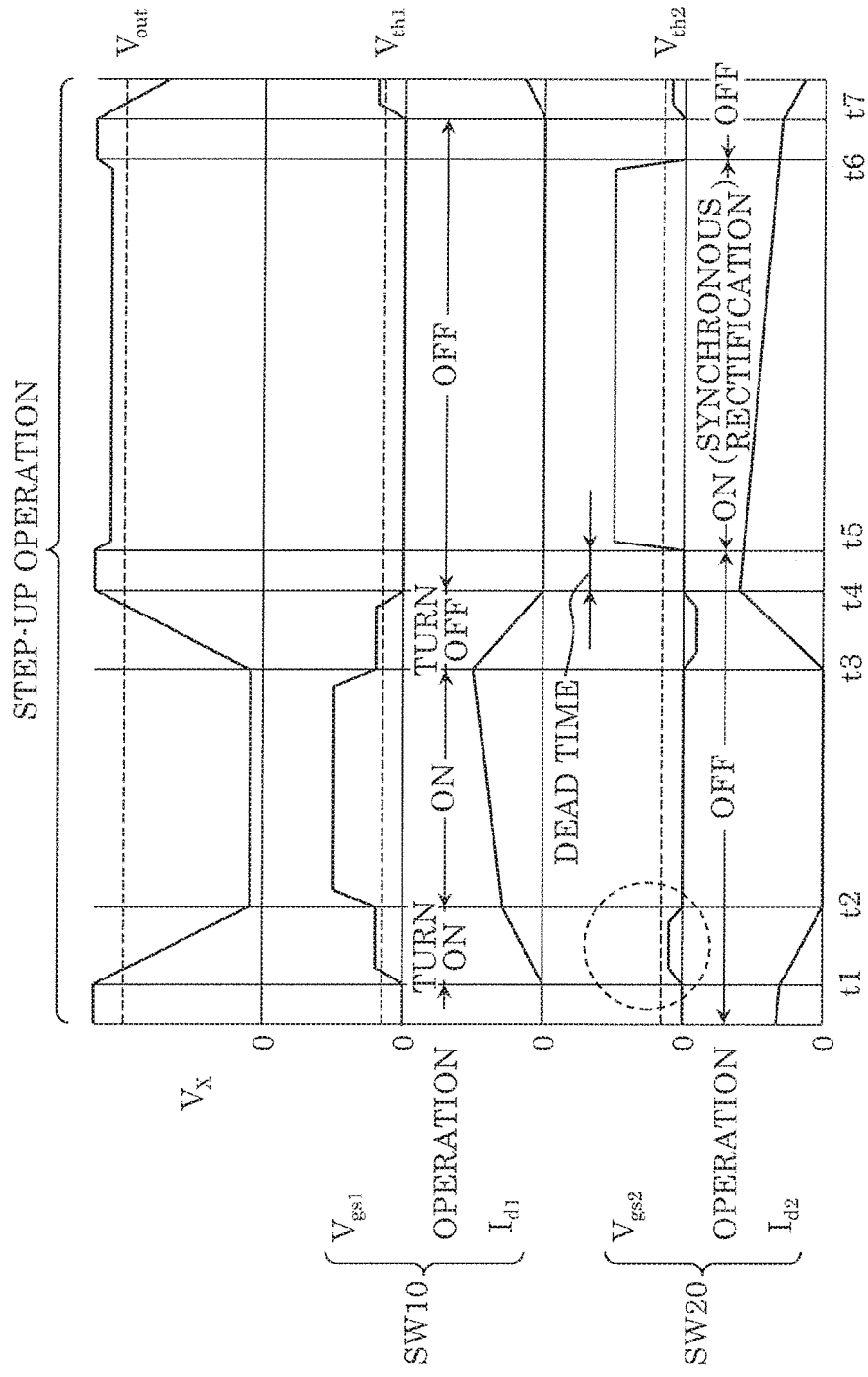

BI-DIRECTIONAL CONVERTER, CONTROLLER, AND SEMICONDUCTOR DEVICE

CROSS REFERENCE TO RELATED APPLICATION

This application is a U.S. continuation application of PCT International Patent Application Number PCT/JP2016/000804 filed on Feb. 17, 2016, claiming the benefit of priority of Japanese Patent Application Number 2015-037417 filed on Feb. 26, 2015, the entire contents of which are hereby incorporated by reference.

BACKGROUND

1. Technical Field

The present disclosure relates to a bi-directional converter, a controller, and a semiconductor device, and, in particular, to a technology of preventing a switching element in a bi-directional converter from turning on unintendedly.

2. Description of the Related Art

Switching converters, which step up a voltage supplied from a power supply and supply the increased voltage to a load, are put in practical use.

In the case where the load that receives supply of the voltage from the switching converter is a device which converts electrical energy into kinetic energy, the load may generate a voltage that is greater than the supplied voltage, due to counter electromotive force. For example, in vehicle applications, solenoids and motors that drive, for example, a fuel injector, various solenoid valves, and a power steering are one example of the load that can generate a high voltage due to counter electromotive force.

Power regeneration in which a high voltage generated at a load is stepped down and collected as electrical power to be used by the power supply (for example, in-vehicle battery), is an important technology of enhancing the efficiency of the power supply utilization. A bi-directional converter which allows both a step-up operation from a power supply to a load and a step-down operation from the load to the power supply can be configured of a switching converter (for example, Japanese Unexamined Patent Application Publication No. 2007-60853, PTL 1), for example.

By the way, a phenomenon what is called self turn-on is known to occur in a power conversion circuit such as a switching converter and an inverter which include switching elements. The self turn-on refers to a phenomenon, in the power conversion circuit, that one switching element that should be kept off turns on unintendedly due to fluctuation of control voltage for the switching element when another switching element is about to turn on. The self turn-on can be a cause of malfunction such as short circuiting of the power supply, for example.

Several countermeasures for avoiding the self turn-on are well-known (for example, Japanese Unexamined Patent Application Publication No. 2000-59189, PTL 2).

PTL 2 discloses a gate circuit which is applied to an inverter. The gate circuit connects a negative bias voltage source that is for off-control and a gate terminal of a switching element via a variable resistor, wherein the variable resistor changes to a small value (for example, to substantially zero resistance) at a predetermined time while the switching element is turning off.

According to the gate circuit, the effects of negative bias increases after a delay that is defined by the predetermined time after the switching element turns off, and the off-state of the switching element is thereby stabilized. Accordingly, the switching element is inhibited from turning on unintendedly after the delay, and a transient gate current is inhibited as well from flowing through the switching element immediately after the switching element turns off.

Thus, the bi-directional converter disclosed in PTL 1 and the gate circuit disclosed in PTL 2, in combination, may achieve a bi-directional converter which yields a certain effect to prevent the switching element from turning on unintendedly.

SUMMARY

However, the gate circuit disclosed in PTL 2 uses a delay signal, which is a delayed gate control signal, to control the variable resistor. A bi-directional converter operates at a relatively high switching frequency, and thus driving such a delay signal separately from the gate control signal not only complicates the delay management but also results in an increase of power consumption. There is another disadvantage that the upper limit of the switching frequency is limited due to the delay.

Thus, the inventors examined in detail the developmental context of the self turn-on unique to a bi-directional converter and have found a novel configuration of the bi-directional converter that is suitable to avoid the self turn-on.

An object of the present disclosure is to provide a bi-directional converter, a controller, and a semiconductor device which avoid the self turn-on during both the step-up operation and the step-down operation.

In order to achieve the above object, a controller according to one aspect of the present disclosure is a controller which controls a bi-directional converter, the bi-directional converter including: a first input/output terminal and a second input/output terminal for receiving and outputting a voltage stepped up by a step-up operation and a voltage stepped down by a step-down operation; a first switching element; a second switching element; and an inductor, the controller including: a first driver which controls the first switching element via a first resistance circuit; a second driver which controls the second switching element via a second resistance circuit; and an operation mode setter which selects one of the step-up operation and the step-down operation, wherein at least one of the first resistance circuit and the second resistance circuit is a variable resistance circuit which has a resistance value that varies for the step-up operation and the step-down operation, in accordance with selection made by the operation mode setter.

Note that these generic and specific aspects may be achieved in a bi-directional converter controlled by the controller, and a semiconductor device which functions as the controller.

According to such a configuration, by using a variable resistance circuit which has a resistance value that varies for the step-up operation and the step-down operation as at least one of the first resistance circuit and the second resistance circuit, the configuration in which the at least one of the first resistance circuit and the second resistance circuit has a resistance value that varies for the step-up operation and the step-down operation can be achieved as a countermeasure against unintended turning on of the first switching element and the second switching element. As a result, a bi-directional converter which avoids the self turn-on during both the step-up operation and the step-down operation is obtained.

BRIEF DESCRIPTION OF DRAWINGS

These and other objects, advantages and features of the disclosure will become apparent from the following descrip

FIG. 5A is a waveform diagram illustrating an example of a step-up operation of the bi-directional converter according to Embodiment 1;

DETAILED DESCRIPTION OF THE EMBODIMENTS (Underlying Knowledge Forming Basis of the Present Invention)

The inventors have found that the bi-directional converter described in the Description of the Related Art section causes the following problems. The problems are described in detail, with reference to the accompanying drawings.

Figure 1:
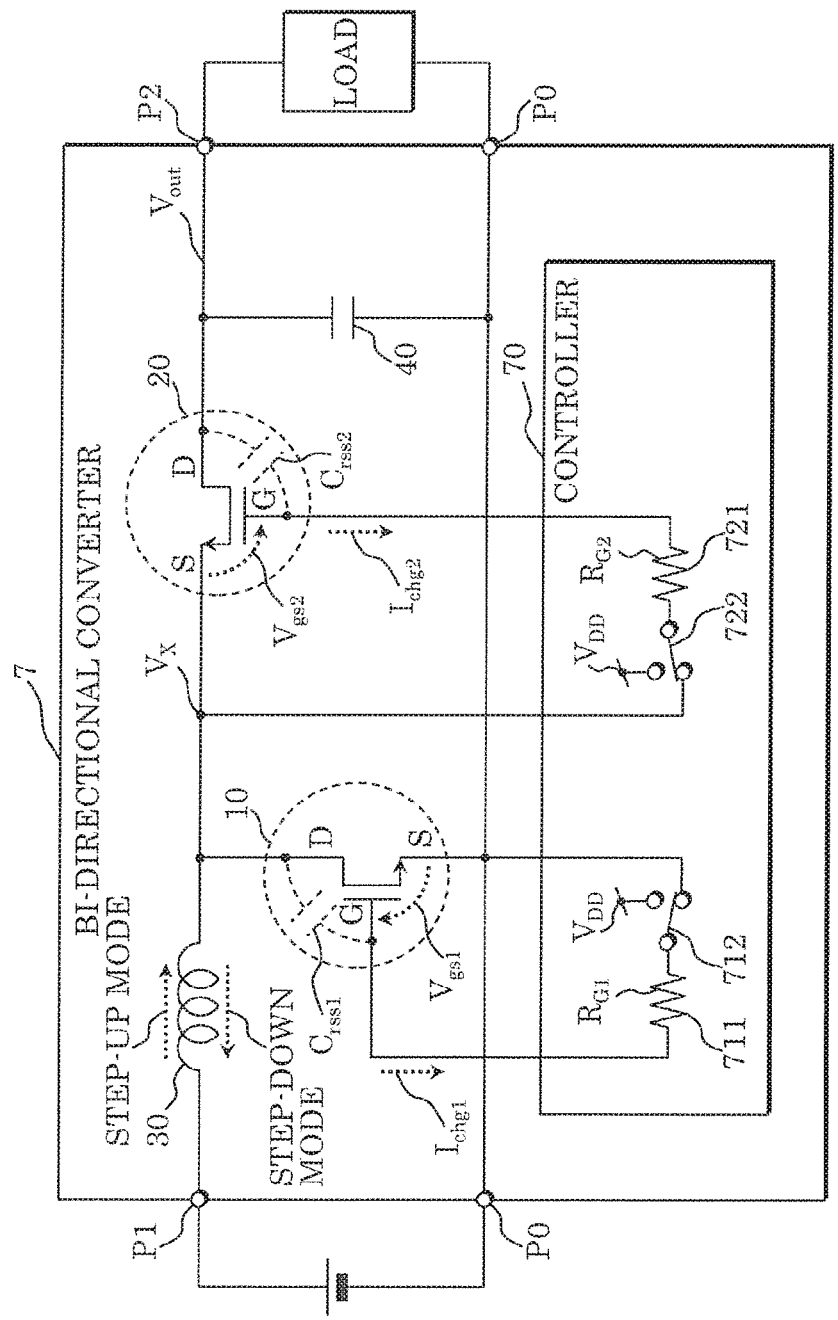
- FIG. 1 is a circuit diagram illustrating an example of a configuration of a principle bi-directional converter.

FIG. 1 is a circuit diagram illustrating an example of a configuration of a principle bi-directional converter.

As illustrated in FIG. 1, bi-directional converter 7 includes common terminal P0, first input/output terminal P1, second input/output terminal P2, first switching element 10, second switching element 20, inductor 30, capacitor 40, and controller 70.

Bi-directional converter 7 selectively executes one of a step-up operation and a step-down operation. The step-up operation refers to an operation of stepping up a voltage applied to first input/output terminal P1, using common terminal P0 as a reference, and outputting the increased voltage to second input/output terminal P2. The step-down operation refers to an operation of stepping down a voltage applied to second input/output terminal P2, using common terminal P0 as a reference, and outputting the reduced voltage to first input/output terminal P1.

Inductor 30 has one end (the left end in FIG. 1) connected to first input/output terminal P1.

First switching element 10 and second switching element 20 are switching elements an on-state and an off-state of each of which are voltage controlled. In FIG. 1, as one example, N-channel metal oxide semiconductor field effect transistors (MOSFET) are employed as first switching element 10 and second switching element 20.

First switching element 10 has a source terminal and a drain terminal connected to the other end (the right end in FIG. 1) of inductor 30 and common terminal P0. First switching element 10 switches between conduction and interruption between the right end of inductor 30 and common terminal P0, in accordance with a voltage applied to a gate terminal, which is a control terminal, of first switching element 10. The reference signs S and D given to first switching element 10 respectively indicate the source terminal and the drain terminal when first switching element 10 turns on unintendedly.

Second switching element 20 has a source terminal and a drain terminal connected to the right end of inductor 30 and second input/output terminal P2. Second switching element 20 switches between conduction and interruption between the right end of inductor 30 and second input/output terminal P2, in accordance with a voltage applied to a gate terminal, which is a control terminal, of second switching element 20. The reference signs S and D given to second switching element 20 respectively indicate the source terminal and the drain terminal when second switching element 20 turns on unintendedly.

Capacitor 40 has one end (the top end in FIG. 1) connected to second input/output terminal P2 and the other end (the bottom end in FIG. 1) connected to common terminal P0. Capacitor 40 smoothes a voltage at second input/output terminal P2.

Controller 70 selectively connects the gate terminal of first switching element 10, via gate resistor 711 and switch 712, to one of a voltage source for placing first switching element 10 into the on-state and a voltage source for placing first switching element 10 into the off-state. In FIG. 1, as one example, positive supply $V_{DD}$ is used as the voltage source for placing first switching element 10 into the on-state, and the source terminal of first switching element 10 is used as the voltage source for placing first switching element 10 into the off-state. Gate resistor 711 has resistance value $R_{G1}$ for limiting a transient gate current of first switching element 10.

Controller 70 also selectively connects the gate terminal of second switching element 20, via gate resistor 721 and switch 722, to one of a voltage source for placing second switching element 20 into the on-state and a voltage source for placing second switching element 20 into the off-state. In FIG. 1, as one example, positive supply $V_{DD}$ is used as the voltage source for placing second switching element 20 into the on-state, and the source terminal of second switching element 20 is used as the voltage source for placing second switching element 20 into the off-state. Gate resistor 721 has resistance value $R_{G2}$ for limiting a transient gate current of second switching element 20.

Bi-directional converter 7 executes the step-up operation under control by controller 70, by alternately switching the destination of a path of current through inductor 30 in the direction indicated as the step-up mode in FIG. 1, between first switching element 10 and second switching element 20.

Bi-directional converter 7 also executes the step-down operation under control by controller 70, by alternately switching the destination of a path of current flows through inductor 30 in the direction indicated as the step-down mode in FIG. 1, between first switching element 10 and second switching element 20.

Next, the self turn-on which occurs in bi-directional converter 7 thus configured is described.

Note that in the following description, the off-state is defined as a state in which a switching element is interrupting a circuit (no current flows) and the on-state is defined as a state in which the switching element is forming the circuit (current flows). Turning on is defined as the switching element changing from the off-state to the on-state. Turning off is defined as the switching element changing from the on-state to the off-state.

Figure 2A:
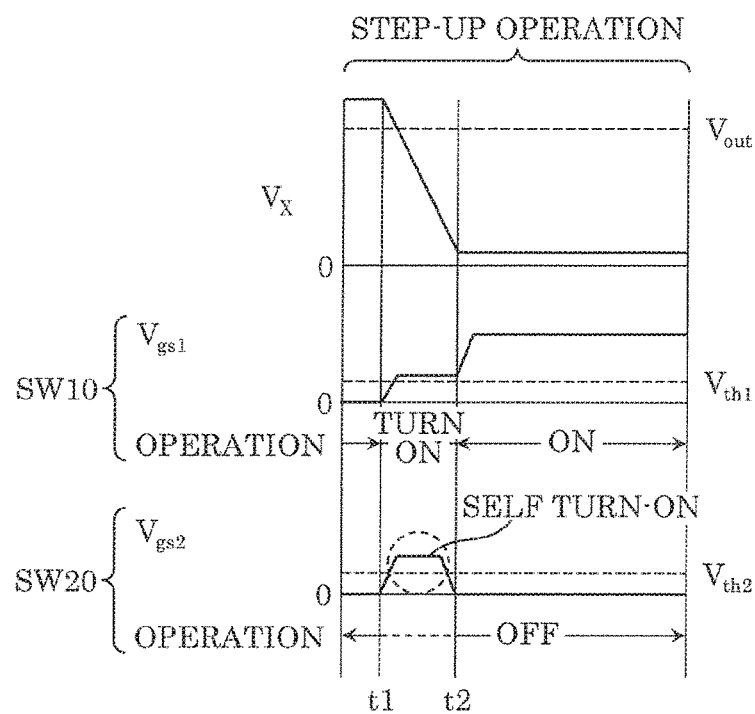
FIG. 2A is a waveform diagram illustrating a problematic phenomenon during a step-up operation of the bi-directional converter.

FIG. 2A is a waveform diagram illustrating a situation where second switching element 20 turns on unintendedly upon execution of the step-up operation by bi-directional converter 7.

From time t1 to time t2 during the step-up operation, first switching element 10 turns on while second switching element 20 is in the off-state.

As first switching element 10 turns on, voltage $V_X$ at the right end of inductor 30 rapidly reduces toward a voltage at common terminal P0. The greater the transient gate current of first switching element 10 is, the greater the slew rate. The slew rate is an absolute value of the amount of change of voltage $V_X$ per unit of time.

At this time, second switching element 20 is placed into the off-state by bringing the gate-source voltage of second switching element 20 to zero via gate resistor 721 and switch 722. For this reason, a voltage ($V_{out}$ minus $V_X$) is applied between the drain and gate of second switching element 20.

Since $V_{out}$ has been smoothed by capacitor 40, drain-gate voltage of second switching element 20 increases at the slew rate of voltage $V_X$, regarding the turning-on period of second switching element 20 as being constant. Feedback capacitor $C_{rss2}$, which is parasitic capacitance of second switching element 20, is present between the drain and gate of second switching element 20. Accordingly, fluctuation of voltage $V_X$ causes current $I_{chg2}$, which is for charging feedback capacitor $C_{rss2}$, to flow from second input/output terminal P2 to the gate terminal of second switching element 20 (Equation 1). Here, $dV_X/dt$ is the slew rate value of voltage $V_X$.

[Math 1]

$$I_{chg2} = C_{rss2}\frac{dV_X}{dt} \qquad \text{(Equation 1)}$$

As current $I_{chg2}$ flows through gate resistor 721, transient voltage $V_{gs2}$ is generated between the gate and source of second switching element 20 (Equation 2).

[Math 2]

$$V_{gs2} = R_{G2}I_{chg2} = R_{G2}C_{rss2}\frac{dV_X}{dt} \qquad \text{(Equation 2)}$$

If voltage $V_{gs2}$ is greater than gate threshold voltage $V_{th2}$ of second switching element 20 as indicated by the dotted circle in FIG. 2A, second switching element 20 turns on. This phenomenon is self turn-on of second switching element 20.

The self turn-on of second switching element 20 yields a period in which first switching element 10 and second switching element 20 are in the on-state concurrently, thereby causing at least some charges stored at capacitor 40 to be discharged through first switching element 10 and second switching element 20. Thus, a problem arises which causes reduction of power conversion efficiency during the step-up operation.

In order to inhibit second switching element 20 from turning on unintendedly during the step-up operation, voltage $V_{gs2}$ which is transiently generated between the gate and source of second switching element 20 may be inhibited.

To do so, use of gate resistor 721 having small resistance value $R_{G2}$ and use of gate resistor 711 having great resistance value $R_{G1}$ for suppressing slew rate value $dV_X/dt$ of voltage $V_X$ are both effective. Resistance value $R_{G1}$ may be a small resistance value insofar as, for example, an instantaneous value of the gate current of second switching element 20 does not exceed a permissible upper limit. Resistance value $R_{G1}$ may be a great resistance value insofar as, for example, switching losses caused by reduction of the slew rate do not exceed a permissible upper limit.

However, such countermeasures in the bi-directional converter cause a conflicting problem that first switching element 10 easily turns on unintendedly during the step-down operation. The problem is now described.

Figure 2B:
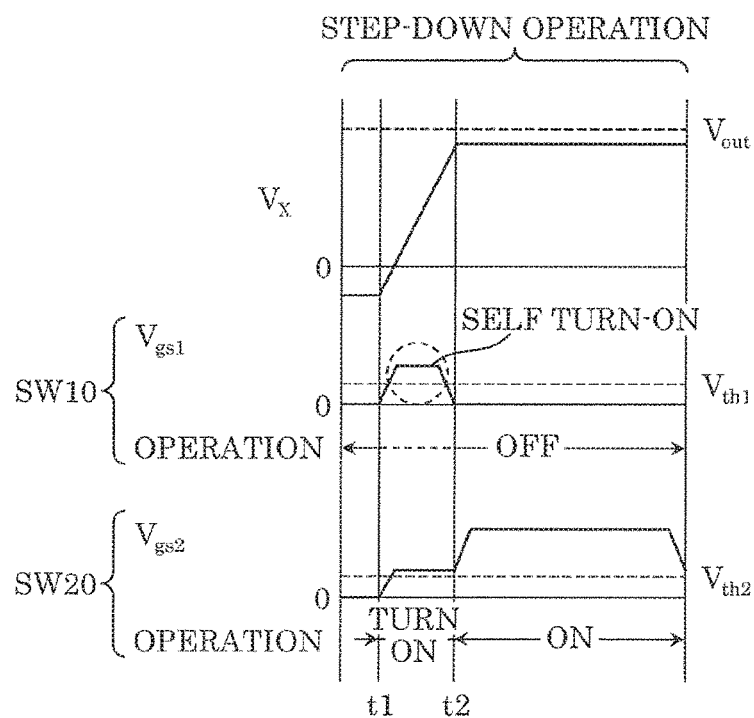
FIG. 2B is a waveform diagram illustrating a problematic phenomenon during a step-down operation of the bi-directional converter.

FIG. 2B is a waveform diagram illustrating a situation where first switching element 10 turns on unintendedly upon execution of the step-down operation by bi-directional converter 7.

From time t1 to time t2 during the step-down operation, second switching element 20 turns on while first switching element 10 is in the off-state.

During the step-down operation, as second switching element 20 turns on, voltage $V_X$ rapidly increases toward a voltage at second input/output terminal P2.

Here, assume that gate resistor 721 having small resistance value $R_{G2}$ and gate resistor 711 having great resistance value $R_{G1}$ are used as the countermeasure against unintended turning on of second switching element 20 during the step-up operation. Slew rate value $dV_X/dt$ of voltage $V_X$ is great due to small resistance value $R_{G2}$. As a result, great current $I_{chg1}$ for charging feedback capacitor $C_{rss1}$, which is parasitic capacitance of first switching element 10, flows through gate resistor 711 (Equation 3).

[Math 3]

$$I_{chg1} = C_{rss1} \frac{dV_X}{dt} \quad \text{(Equation 3)}$$

Current $I_{chg1}$ flows through gate resistor 711 and thereby transient voltage $V_{gs1}$ is generated between the gate and source of first switching element 10 (Equation 4).

[Math 4]

$$V_{gs1} = R_{G1} I_{chg1} = R_{G1} C_{rss1} \frac{dV_X}{dt} \quad \text{(Equation 4)}$$

Since resistance value $R_{G1}$ and current $I_{chg1}$ are great, voltage $V_{gs1}$ is greater than gate threshold voltage $V_{th1}$ of first switching element 10 as indicated by the dotted circle in FIG. 2B. Thus, first switching element 10 turns on.

As such, use of the gate resistor which inhibits second switching element 20 from turning on unintendedly during the step-up operation makes first switching element 10 easily turn on unintendedly during the step-down operation.

First switching element 10 and second switching element 20 being in the on-state concurrently during the step-down operation causes a problem that at least some current from a load flows through common terminal P0 and power that should be regenerated to be used by the power supply is lost.

If first switching element 10 and second switching element 20 are in the on-state concurrently for a long period of time, the voltage across capacitor 40 may end up reducing below the voltage supplied to the load. In that case, it takes a significant settling time to execute the step-up operation again and recover a desired voltage.

The mechanism that the countermeasure against unintended turning on of second switching element 20 during the step-up operation encourages first switching element 10 to turn on unintendedly during the step-down operation has been described in detail in bi-directional converter 7 including first switching element 10 and second switching element 20 that are N-channel MOSFETs. The same applies to a bi-directional converter which employs P-channel MOSFETs as first switching element 10 and second switching element 20.

Figure 3:
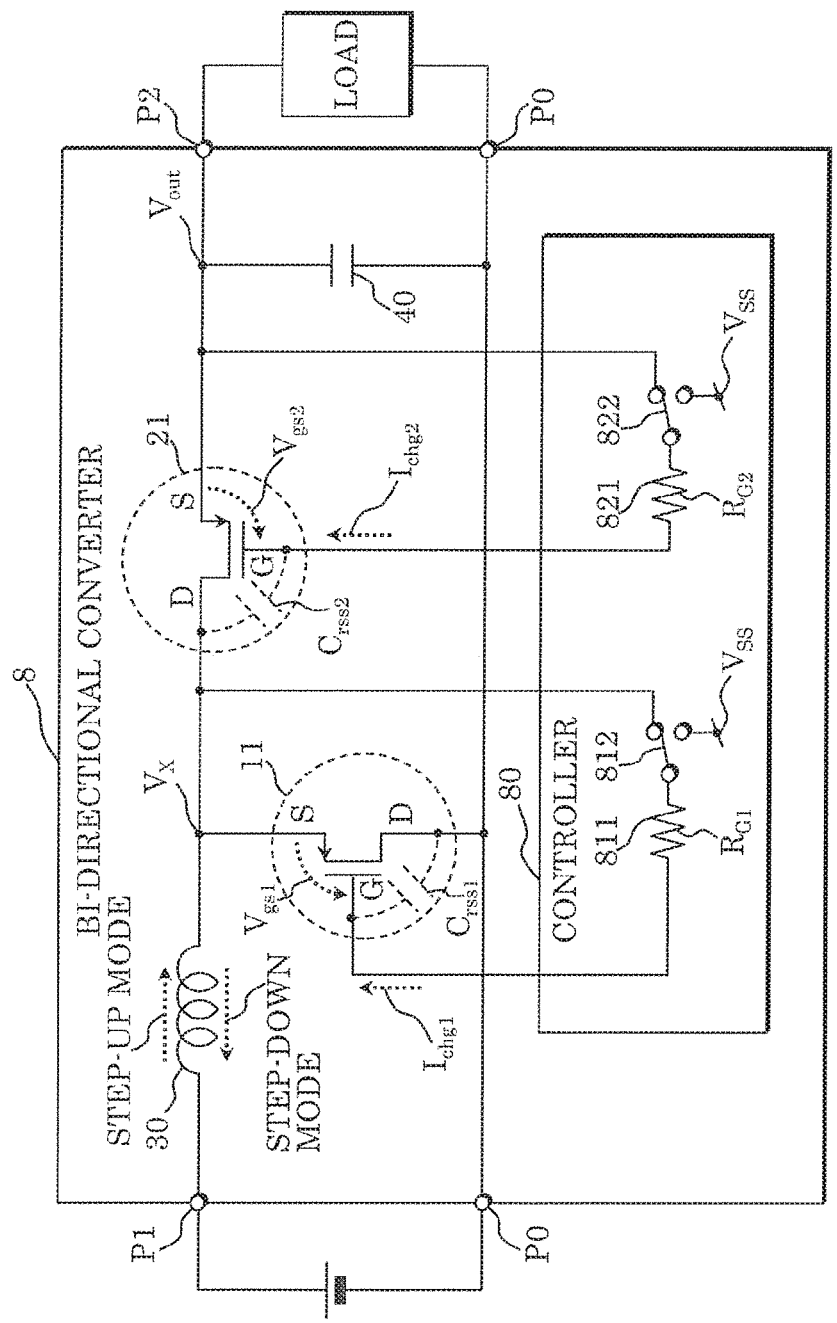
FIG. 3 is a circuit diagram illustrating another example of the configuration of the principle bi-directional converter.

FIG. 3 is a circuit diagram illustrating another example of the principle bi-directional converter.

As illustrated in FIG. 3, bi-directional converter 8 is the same as bi-directional converter 7, except that first switching element 11 and second switching element 21 are P-channel MOSFETs and the configuration of controller 80 is different from that of controller 70.

Controller 80 selectively connects a gate terminal of first switching element 11, via gate resistor 811 and switch 812, to one of negative supply $V_{SS}$ and a source terminal of first switching element 11. Gate resistor 811 has resistance value $R_{G1}$ for limiting the transient gate current of first switching element 11.

Controller 80 also selectively connects a gate terminal of second switching element 21, via gate resistor 821 and switch 822, to one of negative supply $V_{SS}$ and a source terminal of second switching element 21. Gate resistor 821 has resistance value $R_{G2}$ for limiting the transient gate current of second switching element 21.

Here, negative supply $V_{SS}$ is one example of a voltage source for placing first switching element 11 and second switching element 21 into the on-state. The source terminal of first switching element 11 and the source terminal of second switching element 21 are one example of respective voltage sources for placing first switching element 11 and second switching element 21 into the off-state.

Also in bi-directional converter 8 thus configured, as first switching element 11 turns on during the step-up operation, voltage $V_X$ rapidly reduces and a charging current at feedback capacitor $C_{rss2}$ of second switching element 21 flows through gate resistor 721. This generates transient voltage $V_{gs2}$ between the gate and source of second switching element 21. Thus, second switching element 21 can turn on unintendedly.

During the step-down operation also, as second switching element 21 turns on, voltage $V_X$ rapidly increases and a charging current at feedback capacitor $C_{rss1}$ of first switching element 11 flows through gate resistor 711. This generates transient voltage $V_{gs1}$ between the gate and source of first switching element 11. Thus, first switching element 11 can turn on unintendedly.

In bi-directional converter 8, as with bi-directional converter 7, small gate resistor 821 and great gate resistor 811 are effective countermeasures against the unintended turning on of second switching element 20 during the step-up operation. Such countermeasures against the unintended turning on of second switching element 20 during the step-up operation encourage first switching element 10 to turn on unintendedly during the step-down operation.

As such, the inventors examined in detail the developmental context of the self turn-on unique to the bi-directional converter and have found a novel configuration of the bi-directional converter that avoids the self turn-on during both the step-up operation and the step-down operation.

In order to achieve the above object, a controller according to one aspect of the present disclosure is a controller which controls a bi-directional converter, the bi-directional converter including: a first input/output terminal and a second input/output terminal for receiving and outputting a voltage stepped up by a step-up operation and a voltage stepped down by a step-down operation; a first switching element; a second switching element; and an inductor, the controller including: a first driver which controls the first switching element via a first resistance circuit; a second driver which controls the second switching element via a second resistance circuit; and an operation mode setter which selects one of the step-up operation and the step-down operation, wherein at least one of the first resistance circuit and the second resistance circuit is a variable resistance circuit which has a resistance value that varies for the step-up operation and the step-down operation, in accordance with selection made by the operation mode setter.

According to such a configuration, if it is necessary to set the at least one of the first resistance circuit and the second resistance circuit to have a resistance value that varies for the step-up operation and the step-down operation as the countermeasure against the self turn-on of the first switching element and the second switching element, such setting is achieved by employing a variable resistance circuit which has a resistance value that varies for the step-up operation and the step-down operation as the at least one of the first resistance circuit and the second resistance circuit. As a result, a bi-directional converter which can avoid the self turn-on during both the step-up operation and the step-down operation is obtained.

Moreover, the operation mode setter may compare a voltage at the second input/output terminal with a predetermined threshold voltage to generate an operation mode signal that indicates the step-up operation when the voltage at the second input/output terminal is the predetermined threshold voltage or less and generate an operation mode signal that indicates the step-down operation when the voltage at the second input/output terminal is greater than the predetermined threshold voltage.

According to such a configuration, whether the operation is the step-up operation or the step-down operation is indicated according to whether the voltage at the second input/output terminal is in deficient or excess of the predetermined threshold.

Moreover, in the bi-directional converter, the inductor may have a first end connected to the first input/output terminal, the first switching element may switch between conduction and interruption between a second end of the inductor and a common terminal, and the second switching element may switch between conduction and interruption between the second end of the inductor and the second input/output terminal, wherein the first resistance circuit may be a variable resistance circuit whose resistance value is smaller during the step-down operation than during the step-up operation.

Moreover, in the bi-directional converter, the inductor may have a first end connected to the first input/output terminal, the first switching element may switch between conduction and interruption between a second end of the inductor and a common terminal, and the second switching element may switch between conduction and interruption between the second end of the inductor and the second input/output terminal, wherein the second resistance circuit may be a variable resistance circuit whose resistance value is smaller during the step-up operation than during the step-down operation.

According to such a configuration, effective countermeasure is taken during both the step-up operation and the step-down operation of the bi-directional converter which includes the inductor, the first switching element, and the second switching element that are connected to each other as described above.

Moreover, at least one of the first resistance circuit and the second resistance circuit may include a plurality of resistance elements having predetermined resistance values and a switching element which switches between connections to the plurality of resistance elements.

According to such a configuration, the at least one of the first resistance circuit and the second resistance circuit may include the plurality of resistance elements and the switching element.

Moreover, at least one of the first resistance circuit and the second resistance circuit may include a plurality of switching elements which have predetermined resistance values during an on-state.

According to such a configuration, the at least one of the first resistance circuit and the second resistance circuit may include the plurality of switching elements.

Moreover, in order to achieve the above object, the bi-directional converter according to one aspect of the present disclosure includes any of the above controllers, a first switching element controlled by the controller, a second switching element controlled by the controller, and an inductor.

According to such a configuration, a bi-directional converter that is suitable to avoid the self turn-on is obtained using the controller.

Moreover, at least one of the first switching element and the second switching element may be a field effect transistor.

Moreover, at least one of the first switching element and the second switching element may be a III-V wide bandgap transistor or a II-VI wide bandgap transistor.

According to such a configuration, a specific configuration of the at least one of the first switching element and the second switching element is defined.

Moreover, in order to achieve the above object, a semiconductor device according to one aspect of the present disclosure is a semiconductor device which controls a bi-directional converter, the bi-directional converter including a first switching element and a second switching element an on-state and an off-state of each of which are voltage controlled, and an inductor, the semiconductor device including: a first control output terminal connected to a control terminal of the first switching element; a first interruption controlling voltage terminal connected to a voltage source for placing the first switching element into the off-state; a second control output terminal connected to a control terminal of the second switching element; a second interruption controlling voltage terminal connected to a voltage source for placing the second switching element into the off-state; a first driver which selectively connects the first control output terminal, via a first resistance circuit, to one of the first interruption controlling voltage terminal and a voltage source for placing the first switching element into the on-state; a second driver which selectively connects the second control output terminal, via a second resistance circuit, to one of the second interruption controlling voltage terminal and a voltage source for placing the second switching element into the on-state; and an operation mode setter which generates an operation mode signal selectively indicating one of a step-up operation and a step-down operation, wherein at least one of the first resistance circuit and the second resistance circuit is a variable resistance circuit which has a resistance value that varies for the step-up operation and the step-down operation, in accordance with the operation mode signal.

According to such a configuration, a semiconductor device for implementing the controller is provided. In the following, the bi-directional converter according to embodiments of the present disclosure is described in detail.

Embodiment 1

A bi-directional converter according to Embodiment 1 of the present disclosure is a switching converter which includes a first switching element and a second switching element an on-state and an off-state of each of which are voltage controlled, and an inductor. The bi-directional converter according to Embodiment 1 selectively executes one of a step-up operation of stepping up a voltage applied to a first input/output terminal and outputting the stepped up voltage to a second input/output terminal and a step-down operation of stepping down a voltage applied to the second input/output terminal and outputting the stepped down voltage to the first input/output terminal.

The bi-directional converter according to Embodiment 1 is applicable, but not particularly limited, to, for example, devices which drive an electromagnetic load that generates regenerative energy, such as motors, solenoid valves, internal combustion engine injectors, etc., and bi-directional voltage control devices which supply power to a load and returns power to the power supply from the load, such as photoelectric conversion devices and devices which charge/discharge a secondary battery using power from the DC power supply.

Figure 4:
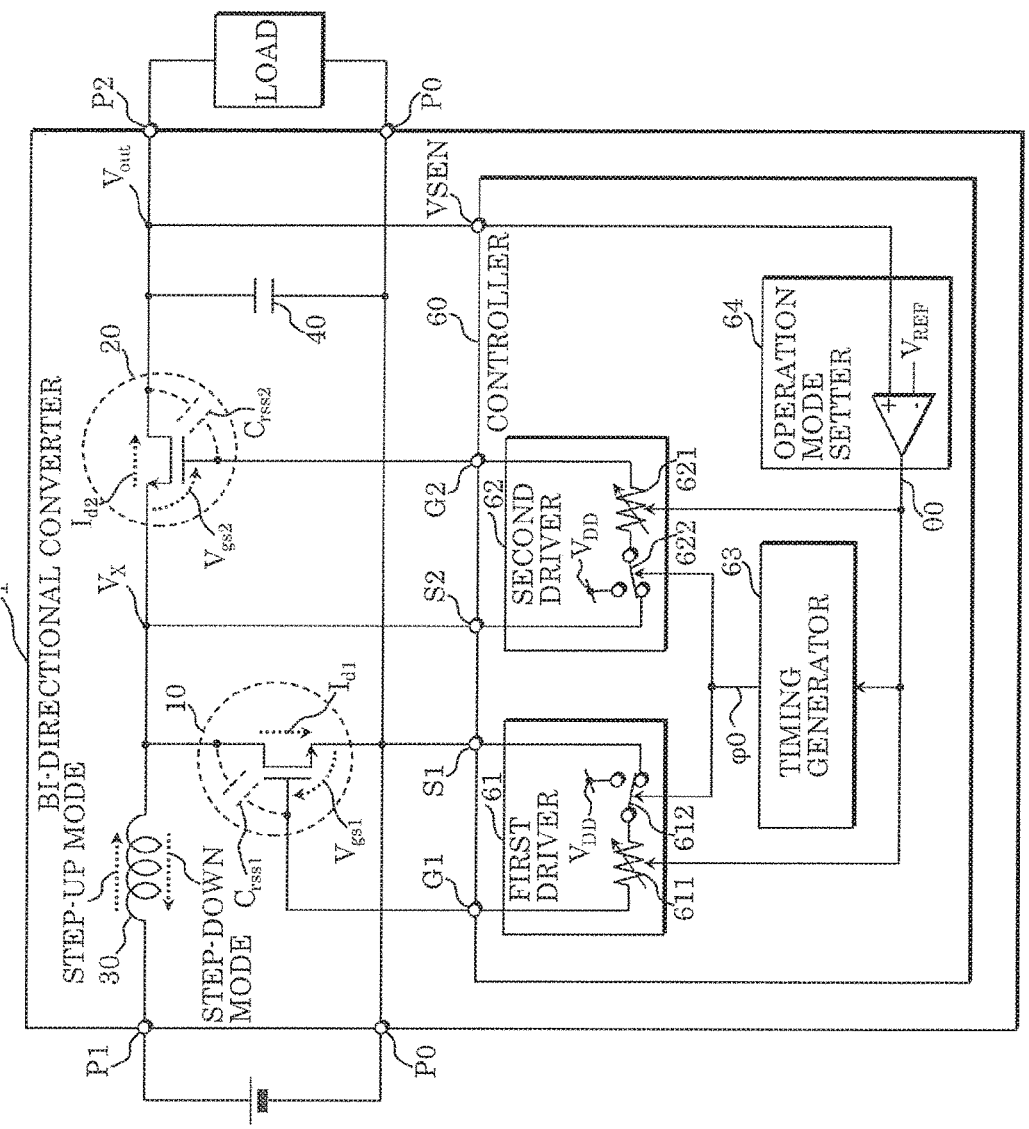
FIG. 4 is a circuit diagram illustrating an example of a functional configuration of a bi-directional converter according to Embodiment 1 of the present disclosure.

FIG. 4 is a circuit diagram illustrating an example of a functional configuration of the bi-directional converter according to Embodiment 1.

As illustrated in FIG. 4, bi-directional converter 1 is the same as bi-directional converter 7 illustrated in FIG. 1, except for controller 60. In the following, the same reference sign is used to refer to the same component that has been described in connection with bi-directional converter 7 and the description is omitted as appropriate, and characterizing features of bi-directional converter 1 are focused.

Controller 60 includes first driver 61, second driver 62, timing generator 63, and operation mode setter 64.

First driver 61 includes first resistance circuit 611 and switch circuit 612, and selectively connects a control terminal of first switching element 10, via first resistance circuit 611, to one of a voltage source for placing first switching element 10 into the on-state and a voltage source for placing first switching element 10 into the off-state.

Second driver 62 includes second resistance circuit 621 and switch circuit 622, and selectively connects a control terminal of second switching element 20, via second resistance circuit 621, to one of a voltage source for placing second switching element 20 into the on-state and a voltage source for placing second switching element 20 into the off-state.

Timing generator 63 generates timing signal φ0 which indicates a timing reference of switching first switching element 10 and second switching element 20 between the on-state and the off-state. First driver 61 and second driver 62 respectively place first switching element 10 and second switching element 20 into the on-state and the off-state, in accordance with timing signal φ0.

Operation mode setter 64 generates operation mode signal θ0 which indicates the step-up operation and the step-down operation in different logic values.

Operation mode setter 64 may, for example, compare a voltage at second input/output terminal P2 with predetermined threshold voltage $V_{REF}$ to generate operation mode signal θ0 which indicates the step-up operation when the voltage at second input/output terminal P2 is threshold voltage $V_{REF}$ or less and indicates the step-down operation when the voltage at second input/output terminal P2 is greater than threshold voltage $V_{REF}$.

Note that threshold voltage $V_{REF}$ is not necessarily be a fixed voltage, and may have hysteresis for stably switching the step-up operation and the step-down operation.

First resistance circuit 611 and second resistance circuit 621 are each a variable resistance circuit which has a resistance value that varies for the step-up operation and the step-down operation in accordance with operation mode signal θ0.

Specifically, first resistance circuit 611 is a variable resistance circuit whose resistance value is smaller during the step-down operation than during the step-up operation, and second resistance circuit 621 is a variable resistance circuit whose resistance value is smaller during the step-up operation than during the step-down operation.

Operation of bi-directional converter 1 thus configured is described.

Bi-directional converter 1 steps up the voltage applied to first input/output terminal P1 to a predetermined voltage using common terminal P0 as a reference by controlling when to switch first switching element 10 and second switching element 20 between the on-state and the off-state.

Note that in the present disclosure, controlling when to switch first switching element 10 and second switching element 20 between the on-state and the off-state is not specifically limited.

For example, in order to adjust the cycle of switching first switching element 10 and second switching element 20 between the on-state and the off-state, timing generator 63 may generate timing signal φ0, using a well-known technique such as pulse width modulation (PWM) control, pulse frequency modulation (PFM) control, or quasi-resonant control, as appropriate.

First driver 61 and second driver 62 may respectively inversely place first switching element 10 and second switching element 20 into the on-state and the off-state, in accordance with timing signal φ0, and may perform synchronous rectification control to prevent backflow of current through second switching element 20 during the step-up operation in order to efficiently convert power.

In the following, an example is described in which the synchronous rectification control is performed during both the step-up operation and the step-down operation.

Timing generator 63 controls first switching element 10 so that first switching element 10 periodically repeats the on-state and the off-state until the voltage at second input/output terminal P2 reaches a first desired voltage greater than the voltage at first input/output terminal P1 connected to the power supply.

FIG. 5A is a waveform diagram illustrating changes in main signals during the step-up operation of bi-directional converter 1 over time, showing waveforms which constitute one cycle of the on-state and off-state of first switching element 10.

Second switching element 20 is controlled so that second switching element 20 performs synchronous rectification. To be more specific, at time t1 to time t3 in which first switching element 10 is in the on-state, second switching element 20 is placed in the off-state and also current flows from the power supply toward common terminal P0 via inductor 30 and first switching element 10. The current is stored as magnetic field energy in inductor 30.

Next, as first switching element 10 turns off at time t3 to time t4, a brief dead time is given at time t4 to time t5 to prevent first switching element 10 and second switching element 20 from turning on concurrently.

At time t5, second switching element 20 turns on. The energy stored in inductor 30 causes current to flow from inductor 30 to second input/output terminal P2 via a parasitic diode (not shown) of second switching element 20. Once second switching element 20 is completely turned on, no current flows through the parasitic diode.

At time t5 to time t6, drain current of second switching element 20 is supplied to a load and any other element that are connected to second input/output terminal P2. Then, voltage at second input/output terminal P2 increases. Although inductor 30 having discharged the stored energy attempts to pass a current in a reverse direction due to the inertia of inductor 30, second switching element 20 is turned off due to the synchronous rectification operation and reverse current is blocked.

During the step-up operation, the gate and source of second switching element 20 are connected via low or substantially zero gate resistance. This can prevent second switching element 20 from turning on unintendedly (see the dotted circle).

While the greater the gate resistance of first switching element 10 is, the less likely second switching element 20 is to turn on unintendedly during the step-up operation, it should be noted that increasing the gate resistance too much extends the turn-on period where first switching element 10 operates in a linear region, and leads to an increase of switching losses. On the contrary, reducing the gate resistance of first switching element 10 too much not only increases the slew rate, which is a cause of self turn-on, but also causes oscillation that is due to gate line impedance, ringing on voltage $V_X$ during on/off switching, and an increase of switching noise. Accordingly, the optimal value of the gate resistance of first switching element 10 may be determined by numerical simulation, for example.

On the other hand, bi-directional converter 1 is caused to operate in step-down mode when overvoltage is generated at the load or when the voltage at second input/output terminal P2 exceeds a second desired voltage greater than the first desired voltage.

Timing generator 63 controls second switching element 20 so that second switching element 20 periodically repeats the on-state and the off-state.

Figure 5B:
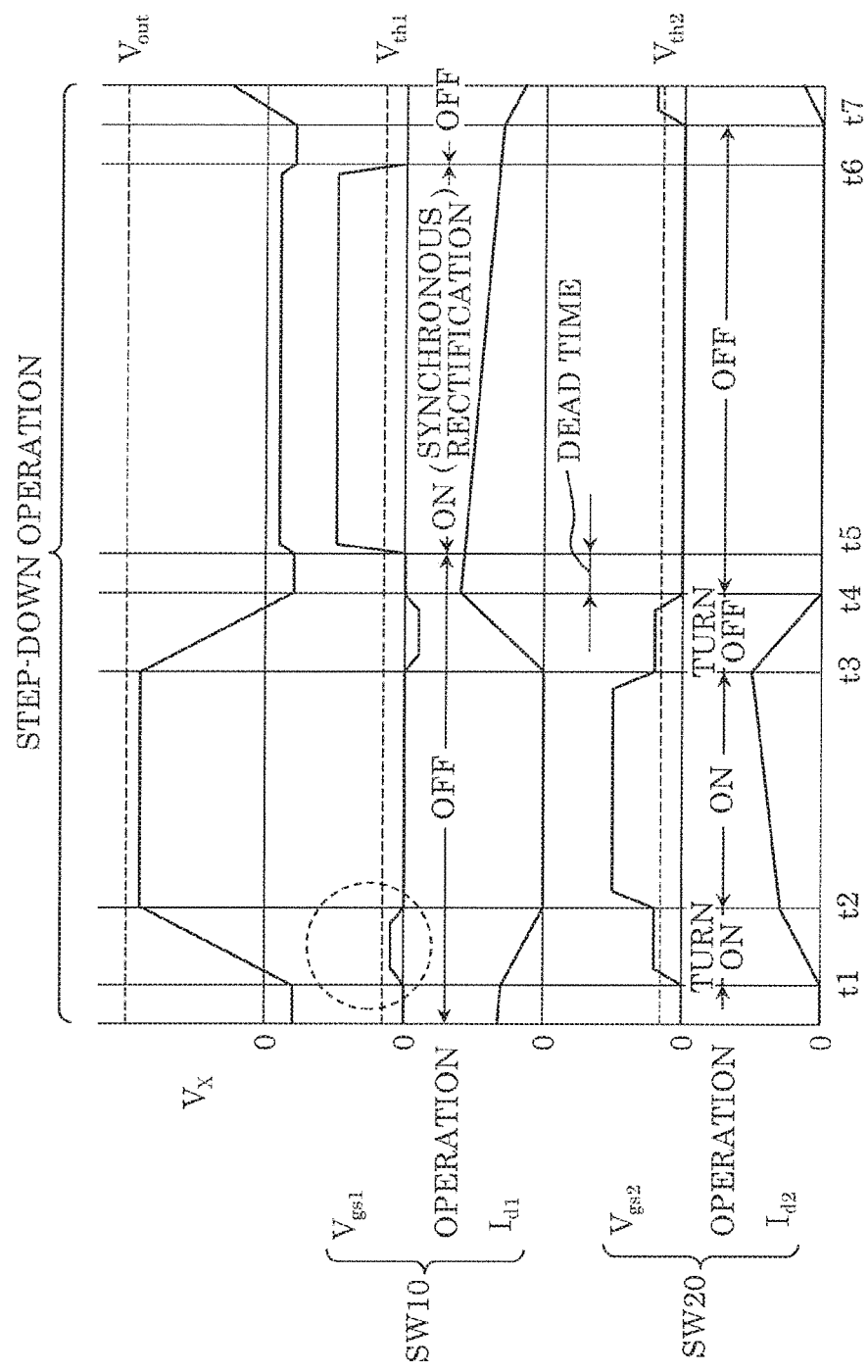
FIG. 5B is a waveform diagram illustrating an example of a step-down operation of the bi-directional converter according to Embodiment 1.

FIG. 5B is a waveform diagram illustrating changes in main signals during the step-down operation of bi-directional converter 1 over time, showing waveforms which constitute one cycle of the on-state and off-state of second switching element 20.

First switching element 10 is controlled so that first switching element 10 performs synchronous rectification. To be more specific, at time t1 to time t3 in which second switching element 20 is in the on-state, first switching element 10 is placed in the off-state and also current flows from the load toward first input/output terminal P1 via second switching element 20 and inductor 30. The current is stored as magnetic field energy in inductor 30.

Next, as second switching element 20 is turned off at time t3 to time t4, a brief dead time is given at time t4 to time t5 to prevent first switching element 10 and second switching element 20 from turning on concurrently.

At time t5, first switching element 10 turns on. The energy stored in inductor 30 causes current to flow from common terminal P0 to first input/output terminal P1 via a parasitic diode (not shown) of first switching element 10. Once first switching element 10 is completely turned on, no current flows through the parasitic diode.

At time t5 to time t6, drain current of first switching element 10 is supplied to the load and any other element that are connected to second input/output terminal P2. Then, voltage at second input/output terminal P2 drops. Although inductor 30 having discharged the stored energy attempts to pass a current in a reverse direction due to the inertia of inductor 30, first switching element 10 is turned off due to the synchronous rectification operation and reverse current is blocked.

During the step-down operation, the gate and source of first switching element 10 are connected via low or substantially zero gate resistance. This can prevent first switching element 10 from turning on unintendedly (see the dotted circle).

As described above with reference to the accompanying drawings, bi-directional converter 1 according to Embodiment 1 inhibits the self turn-on phenomenon which is a cause of power loss and a temporal reduction of the stepped up voltage during the step-up operation in which the voltage stepped up from the power supply voltage is supplied to the load or another power supply including the secondary battery and during the step-down operation in which power is regenerated from the load and the secondary battery when overvoltage or counter electromotive force is generated or when the power supply voltage reduces. Furthermore, switching noise and turn-off surge due to the load upon the regeneration are reduced as well.

A bi-directional converter in which the power supply and the load are connected in reverse order also yields the same advantageous effects and provides an excellent bi-directional voltage control device which supplies power to the load and returns power from the load to the power supply. In particular, application of overvoltage to the load and the transistors can be inhibited by passing a current through the power supply using the power generated by voltage surge which occurs in an electromagnetic load.

Note that some gate drive IC that controls a voltage control device used as an inverter connects a parallel resistor to the gate resistance of a switching element to stabilize negative bias and prevent breakthrough. In this configuration, the slew rate may decrease more than necessary due to the fact that the parallel resistor cannot be optimized in accordance with the switching element.

As one example, the voltage control device used as an inverter may be forced to increase the resistance value and reduce the slew rate when drive current is too large to sufficiently reduce the switching noise by a filter. In that case, a gate resistor that has a large resistance may be built in the gate drive IC while compromising switching efficiency.

In contrast, there is also a power supply field that requires high switching efficiency. As one example, in an internal-combustion engine control apparatus which uses gasoline or light oil as a fuel, such as automobiles, motorcycles, agricultural machinery, machine tools, vessel machinery, etc., an injector which injects the fuel directly into the cylinder is used for the purposes of improvement of fuel consumption and output. Such an in-cylinder direct-injection injector requires lots of energy for injector valve opening operation which uses a fuel that is pressurized to a high pressure. Moreover, the energy needs to be supplied to the injector in a short time to improve control performance (responsivity) and correspond to high rotation speed (high-speed control). In such a power supply field, incorporation of a resistor in the gate drive IC may hinder the suitable switching of the resistance values that is in accordance with the switching element.

In other words, for example, the gate resistance of the switching element is, in general, determined, taking switching losses into account. Thus, the resistance cannot be switched easily, causing deterioration of other characteristics of the switching element.

In contrast, bi-directional converter 1 according to the embodiment of the present disclosure readily adjusts the resistance values as described above and allows excellent characteristics to be attained.

While bi-directional converter 1 according to the present embodiment executes the step-up operation and the step-down operation, using the synchronous rectification in the examples illustrated in FIGS. 5A and 5B, it should be noted that the step-up operation and the step-down operation which alternately switch first switching element 10 and second switching element 20 between the on-state and off-state may be executed without using the synchronous rectification.

Variation 1 of Embodiment 1

Next, specific examples of first driver 61 and second driver 62 according to Variation 1 of Embodiment 1 are described.

Figure 6:
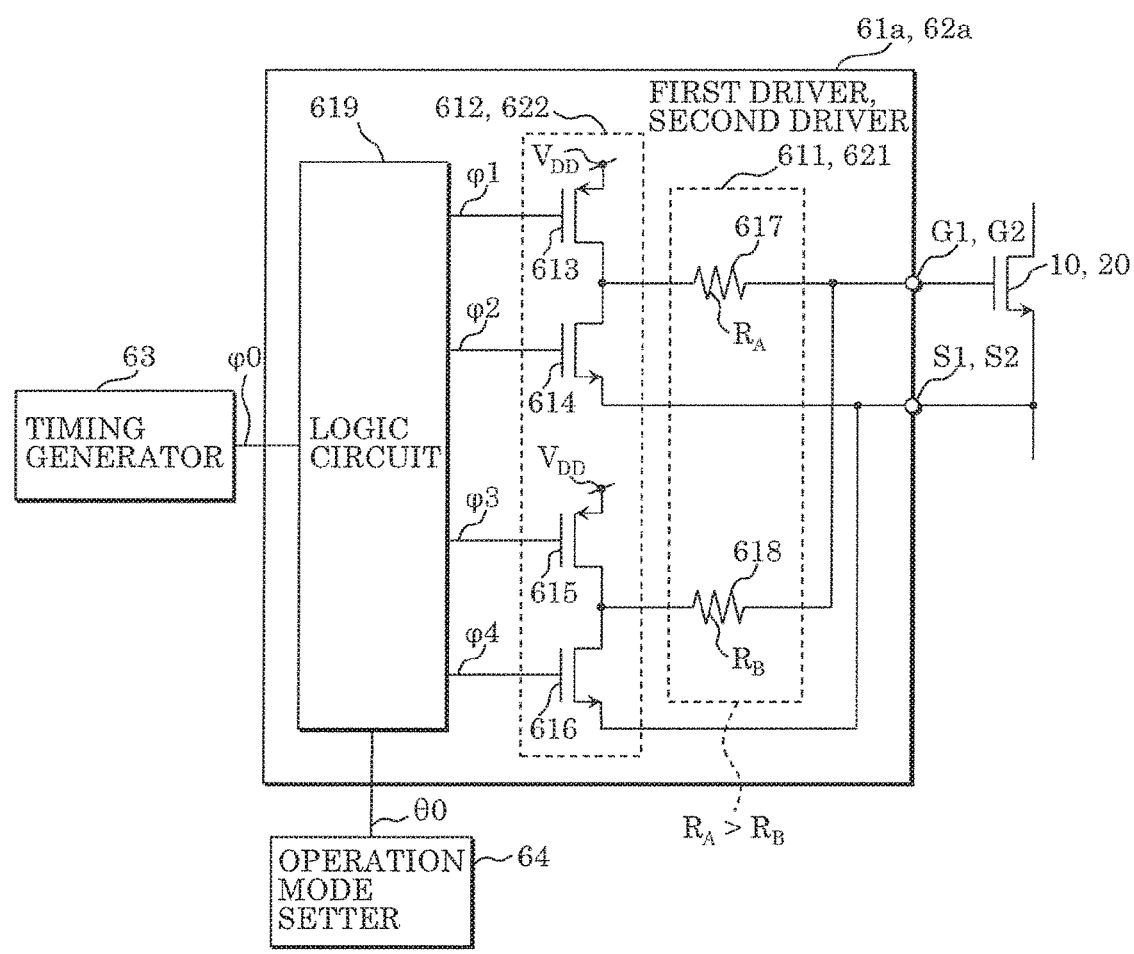
FIG. 6 is a circuit diagram showing an example of configurations of a first driver and a second driver according to Embodiment 1.

FIG. 6 is a circuit diagram illustrating an example of circuit structures of first driver 61a and second driver 62a which are specific examples of first driver 61 and second driver 62, respectively.

First driver 61a includes transistors 613, 614, 615, and 616, resistance elements 617 and 618, and logic circuit 619.

Logic circuit 619 generates gate signals φ1, φ2, φ3, and φ4 from timing signal φ0 and operation mode signal θ0, using a predetermined logical expression. Transistors 613 and 614 constitute an inverter and drives resistance element 617 in accordance with gate signals φ1 and φ2. Transistors 615 and 616 constitute an inverter and drives resistance element 618 in accordance with gate signals φ3 and φ4. Resistance elements 617 and 618 have resistance values $R_A$ and $R_B$, respectively. Here, resistance value $R_A$ is greater than resistance value $R_B$.

Transistors 613, 614, 615, and 616, in combination, which are included in first driver 61a thus configured, function as switch circuit 612. Resistance elements 617 and 618, in combination, function as first resistance circuit 611 having a resistance that is variable by switching the connection between resistance elements 617 and 618 by transistors 613, 614, 615, and 616.

Second driver 62a has configuration equivalent to that of first driver 61a. However, logic circuit 619 included in second driver 62a have different logical expressions for generating gate signals φ1, φ2, φ3, and φ4, as compared to logic circuit 619 included in first driver 61a.

Note that resistance value $R_A$ may represent different resistance values for first driver 61a and second driver 62a, and the same applies for resistance value $R_B$. First Driver 61a and second driver 62a each may satisfy: resistance value $R_A > R_B$. Resistance value $R_B$ may be substantially zero resistance (i.e., resistance element 618 may be absent).

Figure 7:
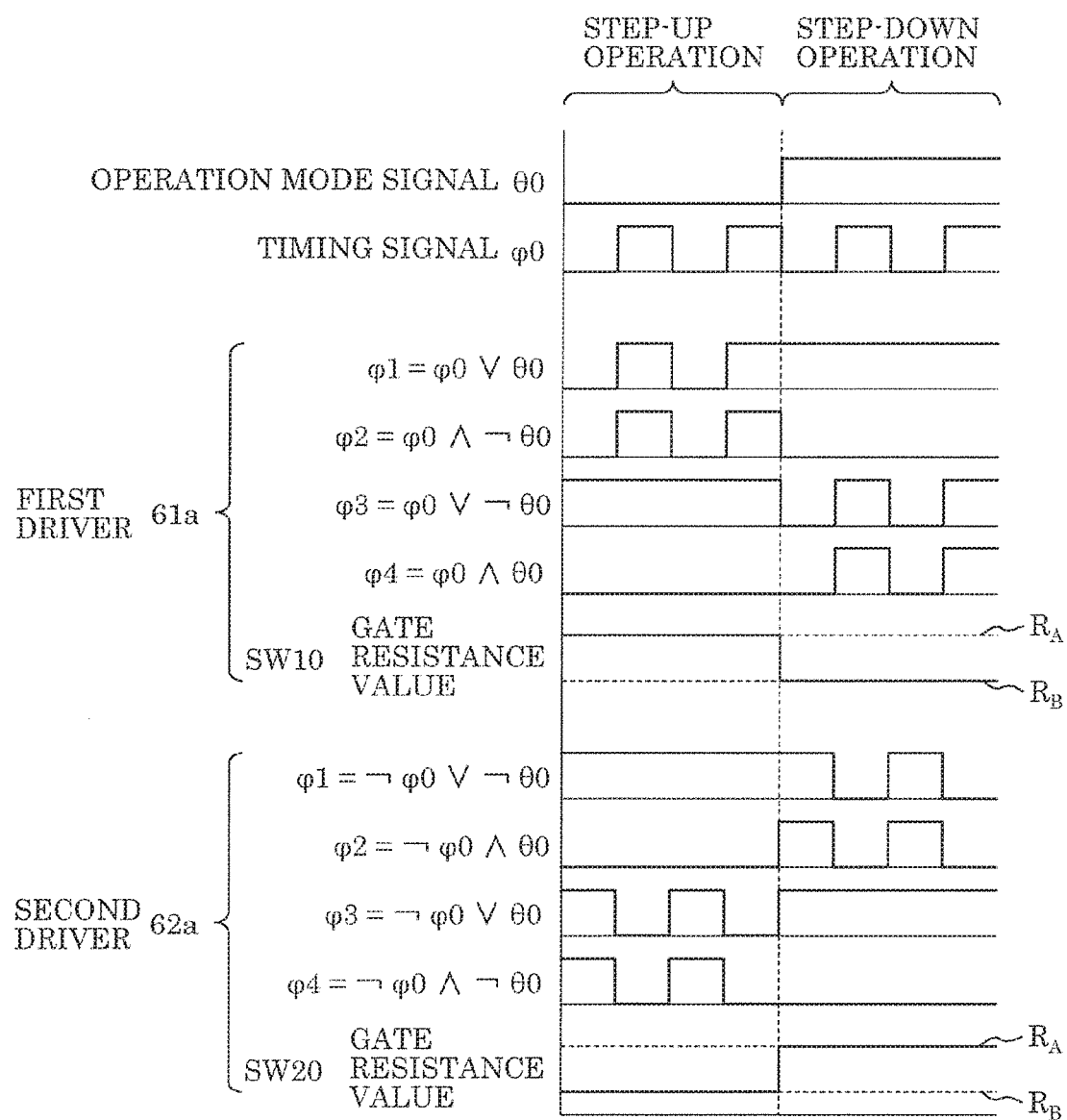
FIG. 7 is a diagram illustrating an example of operations of the first driver and the second driver according to Embodiment 1.

FIG. 7 is a diagram illustrating an example of operations of first driver 61a and second driver 62a. First driver 61a and second driver 62a generate gate signals φ1, φ2, φ3, and φ4 from operation mode signal θ0 and timing signal φ0, using the logical expression illustrated in FIG. 7.

For simplification, operation mode signal θ0 being low indicates the step-up operation and being high indicates the step-down operation. Moreover, timing signal φ0 being low indicates a time at which first switching element 10 is placed into the on-state, and being high indicates a time at which second switching element 20 is placed into the on-state. Although not shown, it should be noted that first switching element 10 and second switching element 20 each may give a dead-time signal indicating when to turn off.

During the step-up operation, transistors 615 and 616 that are included in first driver 61a and connected to resistance element 618 (resistance value $R_B$) are all maintained off. First switching element 10 is placed into one of the on-state and the off-state by connecting the gate terminal of first switching element 10 to one of positive supply $V_{DD}$ and the source terminal of first switching element 10 via resistance element 617 (resistance value $R_A$) and one of transistors 613 and 614.

Accordingly, during the step-up operation, the gate resistance of first switching element 10 is set to resistance value $R_A$ that is the greater one of resistance values $R_A$ and $R_B$. Thus, the transient gate current of first switching element 10 is inhibited and the slew rate value of drain voltage ($V_X$) reduces. As a result, transient charging current at feedback capacitor $C_{rss2}$ of second switching element 20 is also inhibited.

During the step-up operation, transistors 613 and 614 that are included in second driver 62a and connected to resistance element 617 (resistance value $R_A$) are all maintained off. Second switching element 20 is placed into one of the on-state and the off-state by connecting the gate terminal of second switching element 20 to one of positive supply $V_{DD}$ and the source terminal of second switching element 20 via resistance element 618 (resistance value $R_B$) and one of transistors 615 and 616.

Accordingly, during the step-up operation, the gate resistance of second switching element 20 is set to resistance value $R_B$ that is the smaller one of resistance values $R_A$ and $R_B$. A charging current at feedback capacitor $C_{rss2}$ is suppressed by increasing the gate resistance of first switching element 10. The less the gate resistance of second switching element 20 is, the less gate-source voltage $V_{gs2}$ that is transiently generated at second switching element 20. Note that, as is clear from gate signals φ1, φ2, φ3, and φ4, the gate resistance of first switching element 10 is set to resistance value $R_B$ and the gate resistance of second switching element 20 is set to resistance value $R_A$ during the step-down operation.

In this manner, the gate resistance of first switching element 10 is set great and the gate resistance of second switching element 20 is set small during the step-up operation, and the gate resistance of first switching element 10 is set small and the gate resistance of second switching element 20 is set great during the step-down operation. This yields an advantageous effect of avoiding self turn-on during both the step-up operation and the step-down operation.

Note that gate signals φ1, φ2, φ3, and φ4 for switching the resistance values of first resistance circuit 611 and second resistance circuit 621 are not limited to the example in FIG. 7. For example, resistance element 617 (resistance value $R_A$) can be used for the resistor having a high resistance value and the parallel resistance (resistance value $R_A//R_B$, where the sign "//" indicates a parallel resistance value) of resistance elements 617 and 618 can be used for the resistor having a low resistance value by transforming some of gate signals φ1, φ2, φ3, and φ4.

Figure 8:
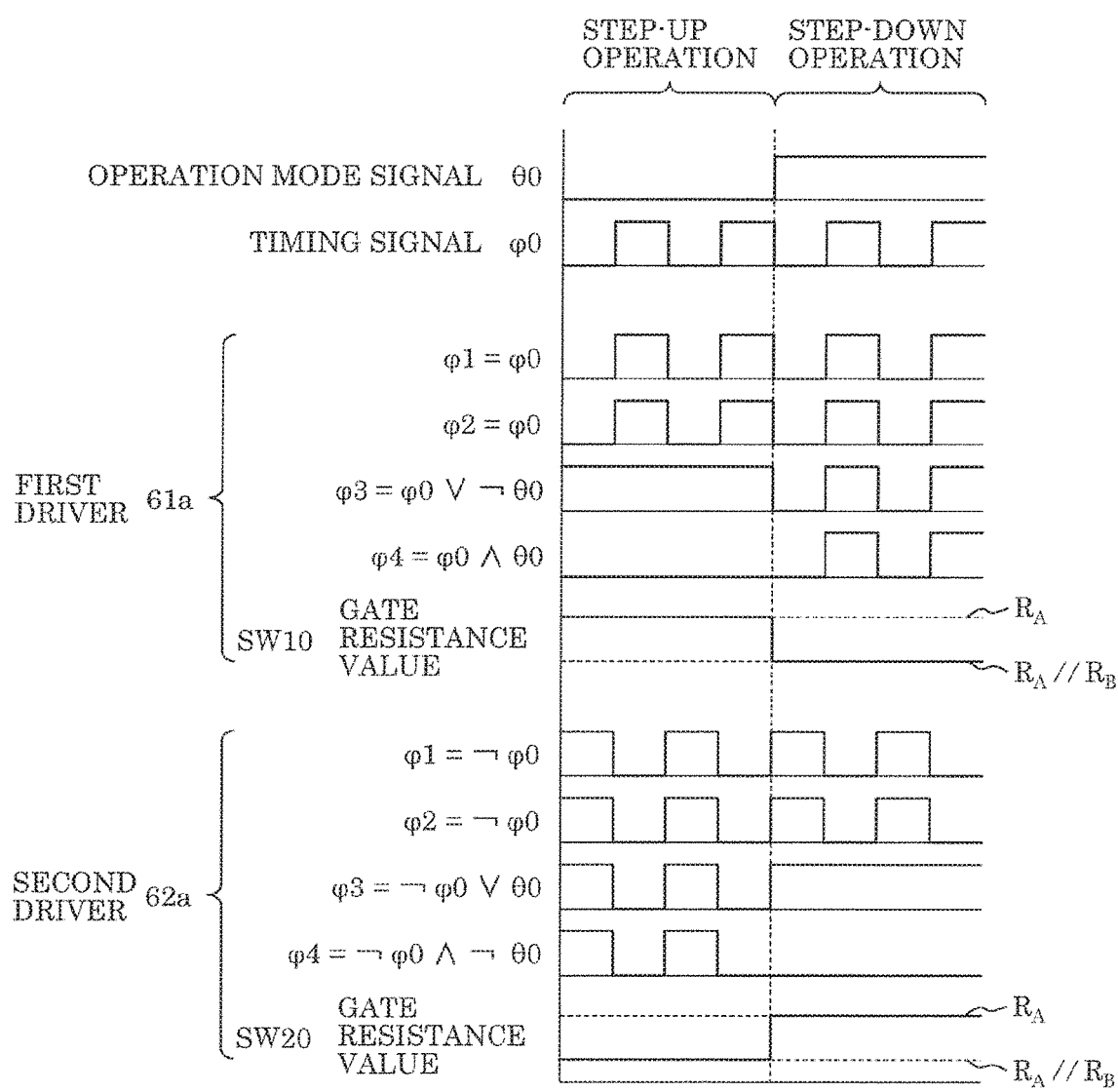
FIG. 8 is a diagram illustrating another example of the operations of the first driver and the second driver according to Embodiment 1.

FIG. 8 is a diagram illustrating an example of operations of first driver 61a and second driver 62a according to such a variation of Embodiment 1. FIG. 8 is different from FIG. 7 in logical expression for generating gate signals φ1, φ2, φ3, and φ4.

In accordance with gate signals φ1, φ2, φ3, and φ4 illustrated in FIG. 8, transistors 613 and 614 are driven by first driver 61a and transistors 615 and 616 are driven by second driver 62a, irrespective of the step-up operation and the step-down operation.

As a result, the gate resistance of second switching element 20 during the step-up operation and the gate resistance of first switching element 10 during the step-down operation are both set to the parallel resistor (resistance value $R_A//R_B$) of resistance elements 617 and 618. Since resistance value $R_A//R_B$ is smaller than resistance value $R_A$, use of gate signals φ1, φ2, φ3, and φ4 in FIG. 8 yields effects same as those obtained from the configuration in FIG. 6.

Figure 9:
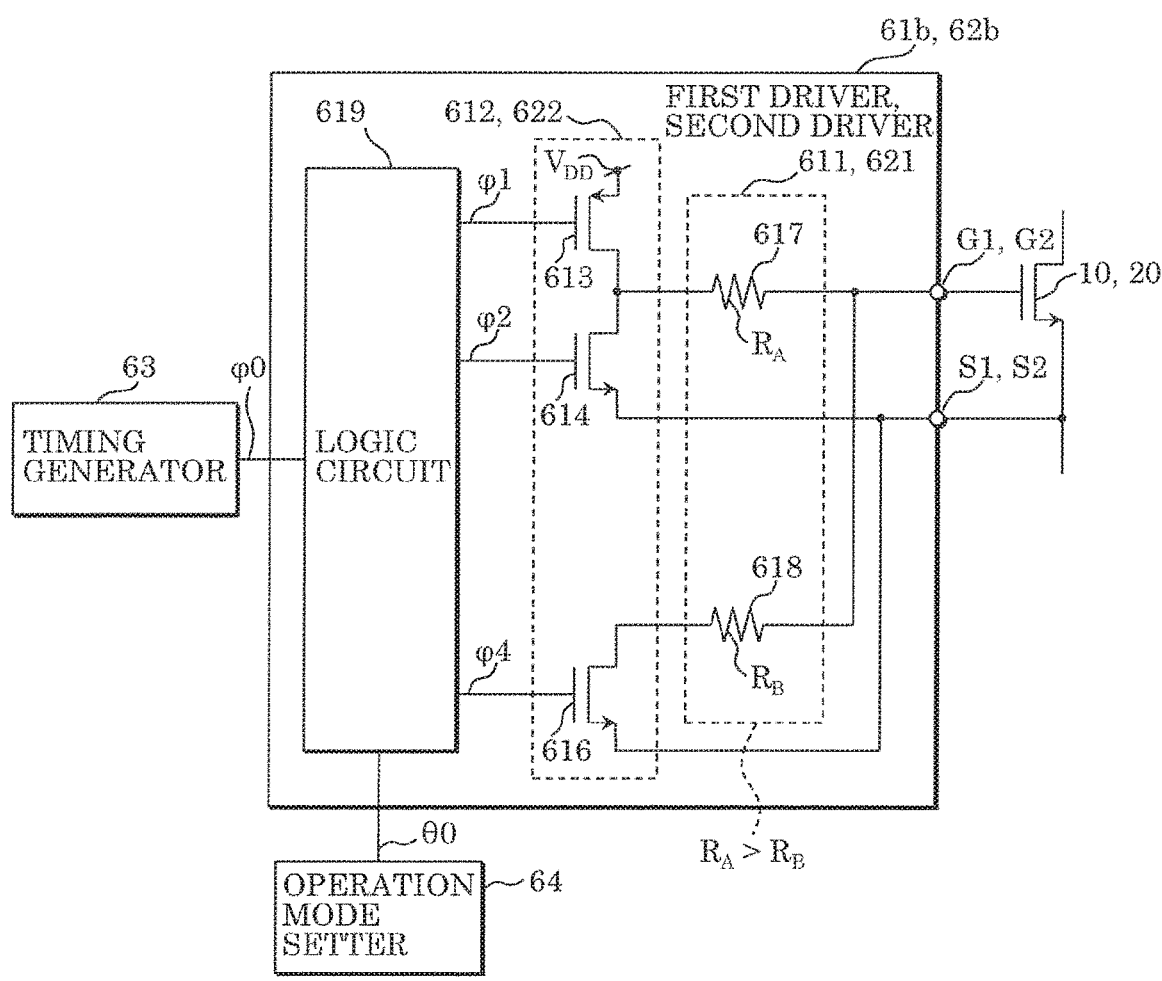
FIG. 9 is a circuit diagram illustrating another example of the configurations of the first driver and the second driver according to Embodiment 1.

Variation 2 of Embodiment 1 FIG. 9 is a circuit diagram illustrating an example of circuit structures of first driver 61b and second driver 62b which are another specific examples of first driver 61 and second driver 62, respectively.

Figure 10:
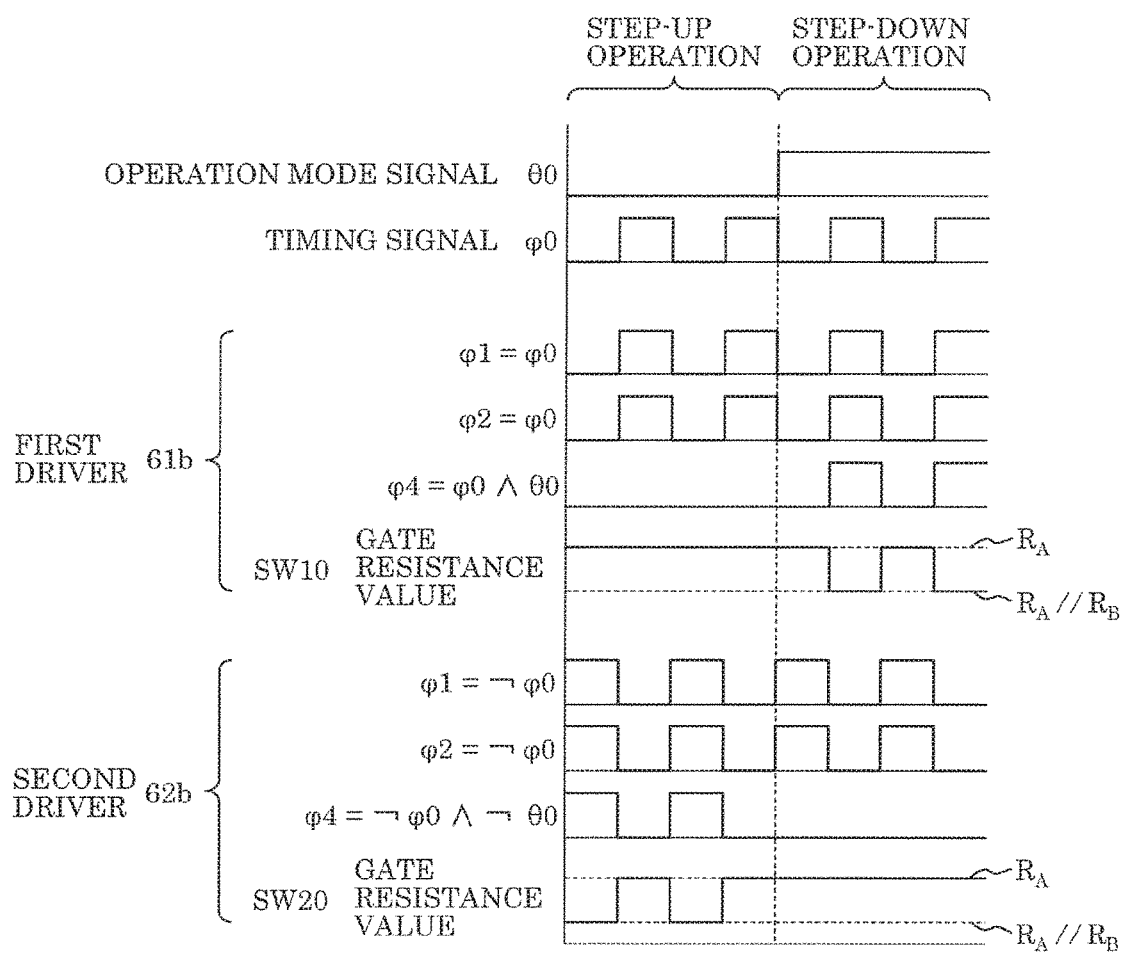
FIG. 10 is a diagram illustrating another example of the operations of the first driver and the second driver according to Embodiment 1.

FIG. 10 is a diagram illustrating an example of operations of first driver 61b and second driver 62b.

During the step-down operation, first driver 61b sets the gate resistance to $R_A$ to place first switching element 10 into the on-state, and sets the gate resistance to resistance value $R_A//R_B$ to place first switching element 10 into the off-state.

During the step-up operation, second driver 62b sets the gate resistance to $R_A$ to place first switching element 10 into the on-state, and sets the gate resistance to resistance value $R_A//R_B$ to place first switching element 10 into the off-state.

Also according to such a configuration, the gate resistance value for placing first switching element 10 in the off-state during the step-down operation and the gate resistance value for placing second switching element 20 in the off-state during the step-up operation are set to parallel resistance value $R_A//R_B$ smaller than resistance value $R_A$, thereby yielding the effect of preventing self turn-on, as with FIG. 8.

Other Variations of Embodiment 1

Figure 11:
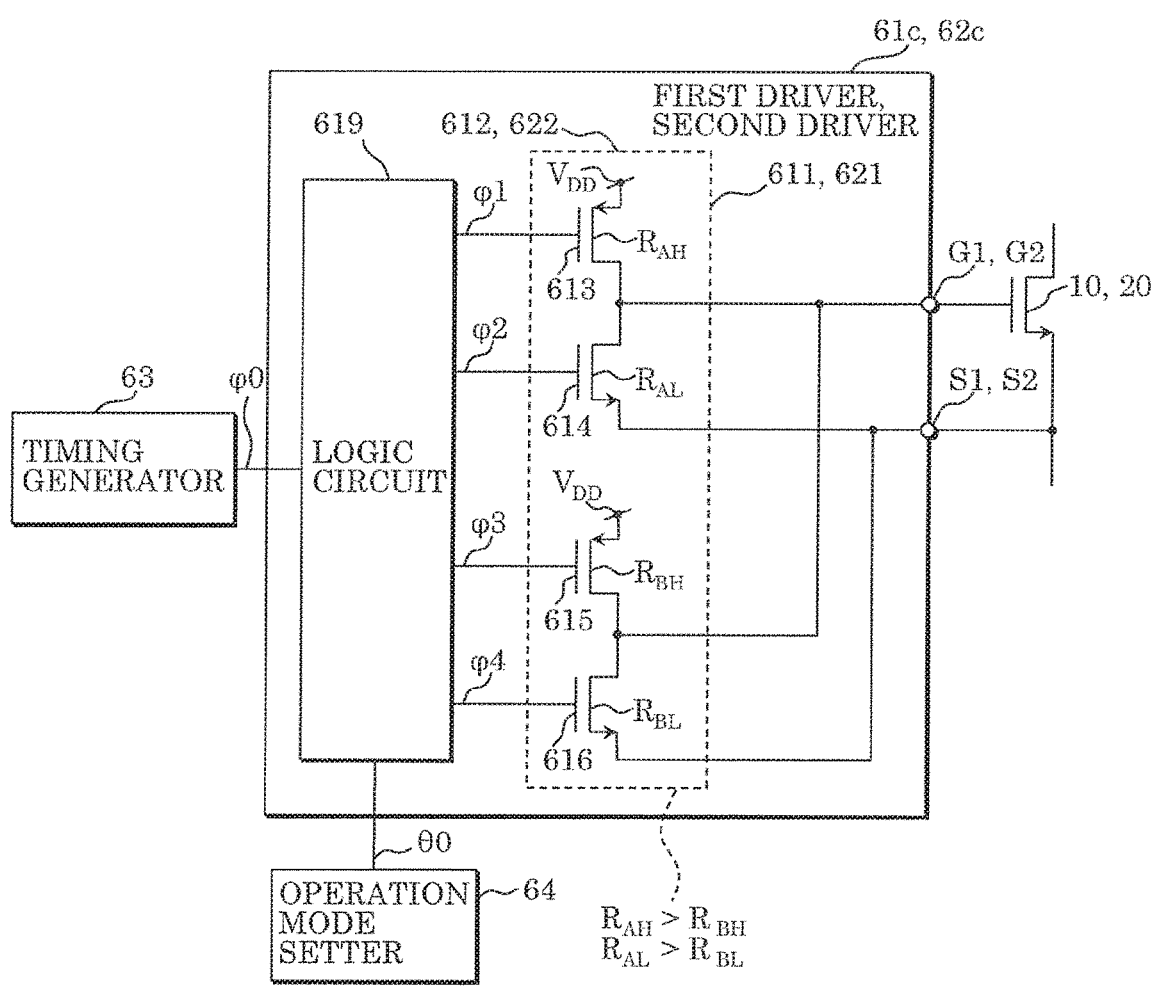
FIG. 11 is a circuit diagram illustrating another example of the configurations of the first driver and the second driver according to Embodiment 1.
Figure 12:
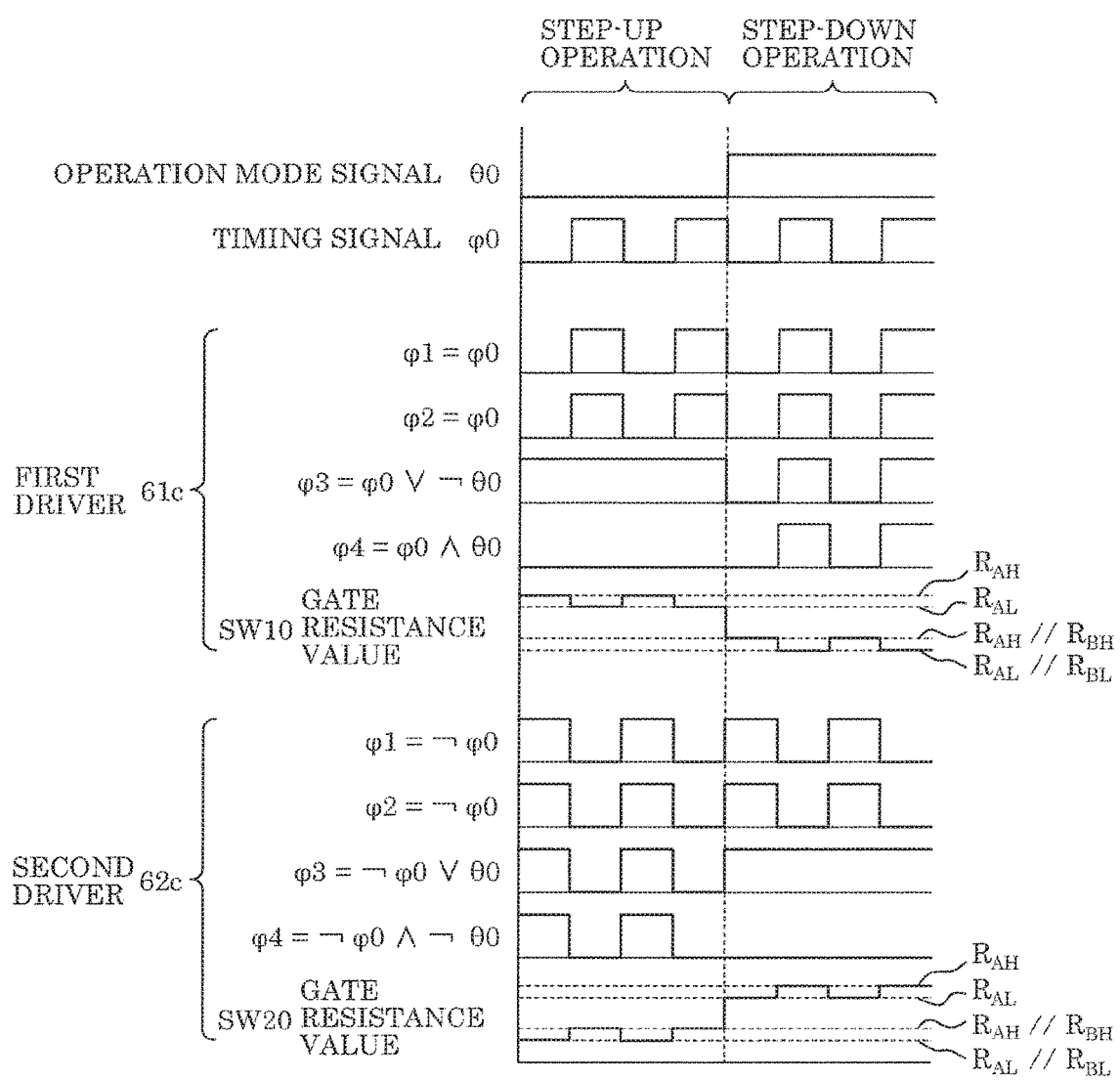
FIG. 12 is a diagram illustrating another example of the operations of the first driver and the second driver according to Embodiment 1.

FIGS. 11 and 12 are diagrams illustrating configurations and operations of first driver 61c and second driver 62c which include, instead of resistance elements 617 and 618 in FIG. 6, transistors 613, 614, 615, and 616 which are caused to provide predetermined on-resistances by adjusting channel widths and channel lengths of transistors 613, 614, 615, and 616. The operation illustrated in FIG. 12 is the same as the operation illustrated in FIG. 8.

Figure 13:
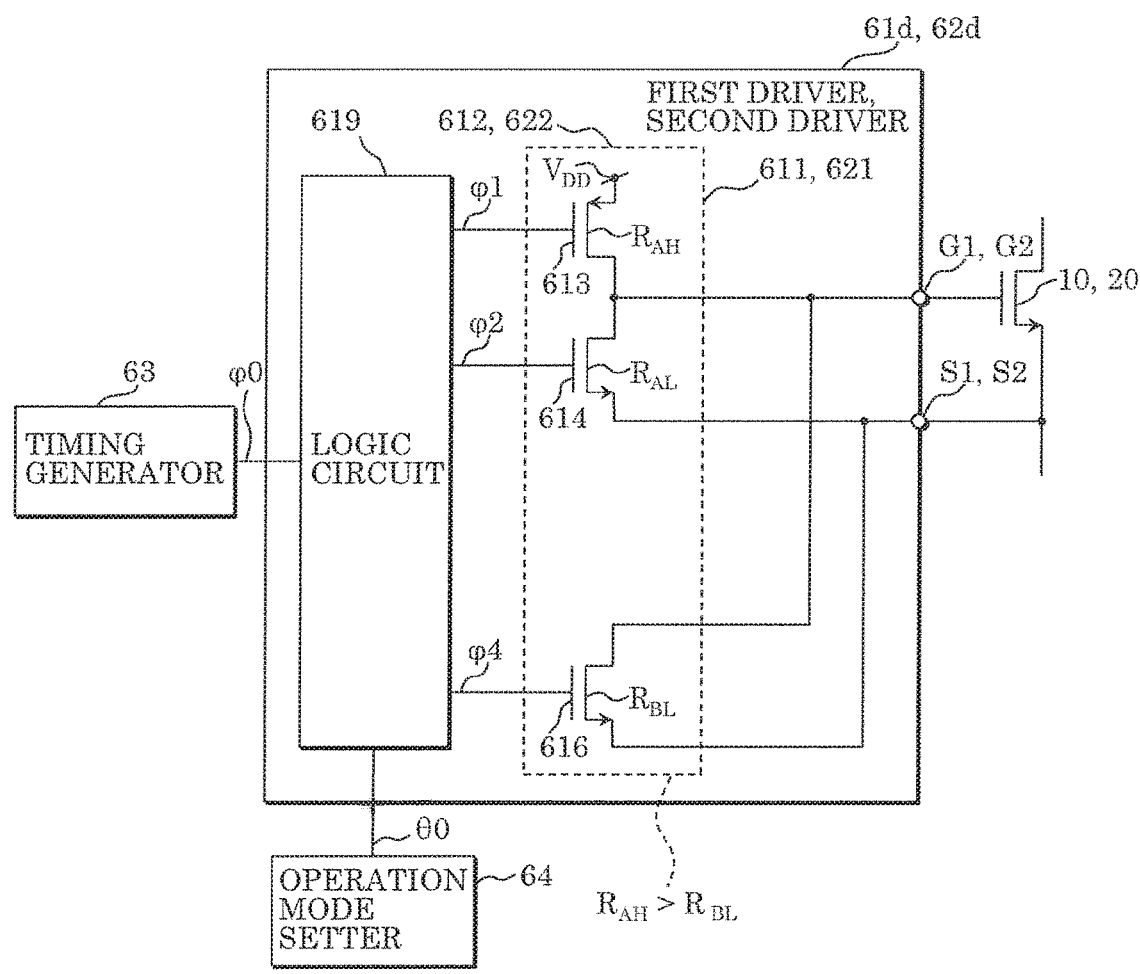
FIG. 13 is a circuit diagram illustrating another example of the configurations of the first driver and the second driver according to Embodiment 1.
Figure 14:
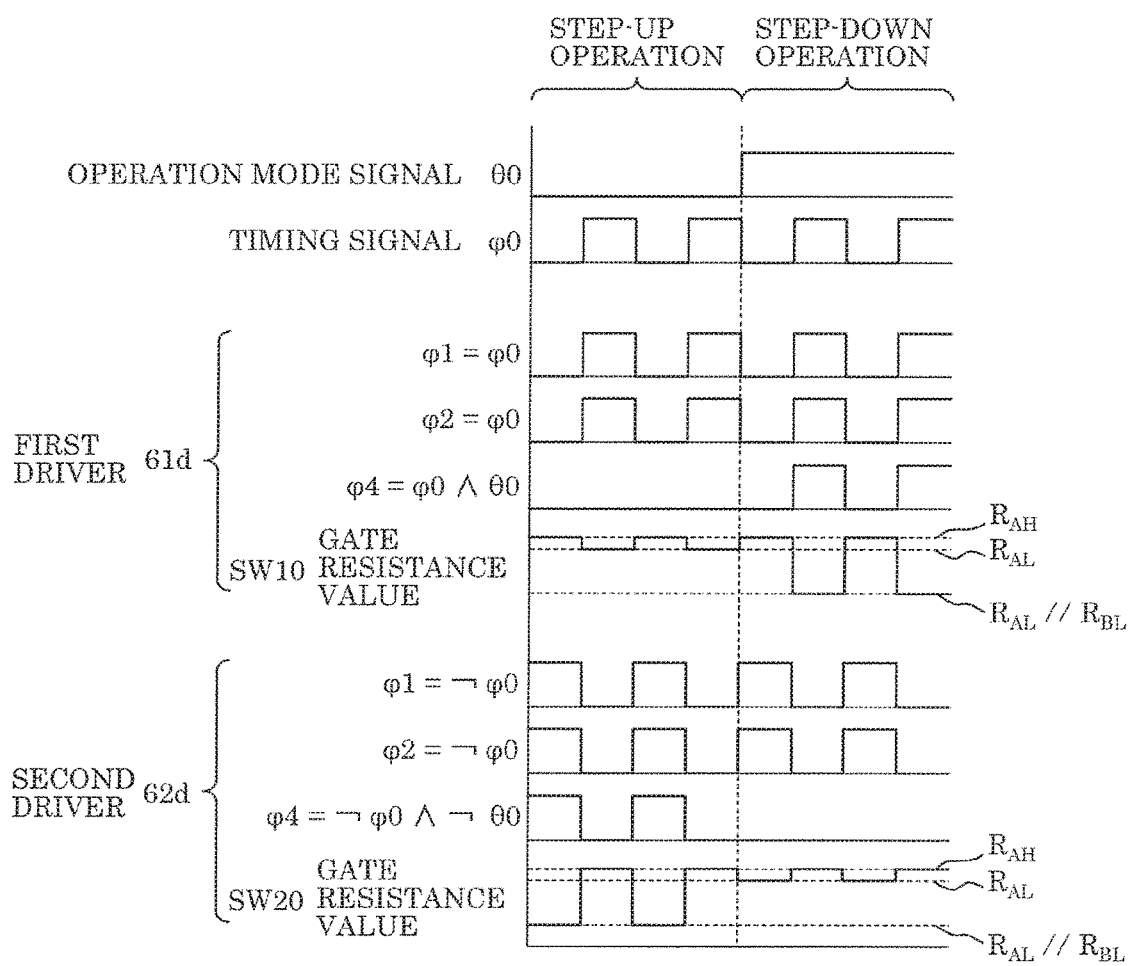
FIG. 14 is a diagram illustrating another example of the operations of the first driver and the second driver according to Embodiment 1.

FIGS. 13 and 14 are diagrams illustrating configurations and operations of first driver 61d and second driver 62d which include, instead of resistance elements 617 and 618 in FIG. 9, transistors 613, 614, and 616 which are caused to provide predetermined on-resistances by adjusting channel widths and channel lengths of transistors 613, 614, and 616. Note that the operation illustrated in FIG. 14 is the same as the operation illustrated in FIG. 10.

Note that the specific examples described above of first driver 61 and second driver 62 may be combined in any way.

An example has been described in which the resistance is adjusted, and, specifically, the channel sizes of the transistors which constitute an inverter are adjusted to limit the transient current through the gate by resistance. However, the present disclosure does not limit the way of limiting the current. There is another method to limit the transient current such as limiting the current value by a constant current source, for example.

Embodiment 2

Bi-directional converter 2 according to the present embodiment is the same as bi-directional converter 1 according to Embodiment 1, except that the resistance value of first switching element 10 is not switched. In the following, the bi-directional converter according to the present embodiment is described, focusing on differences from Embodiment 1.

Figure 15:
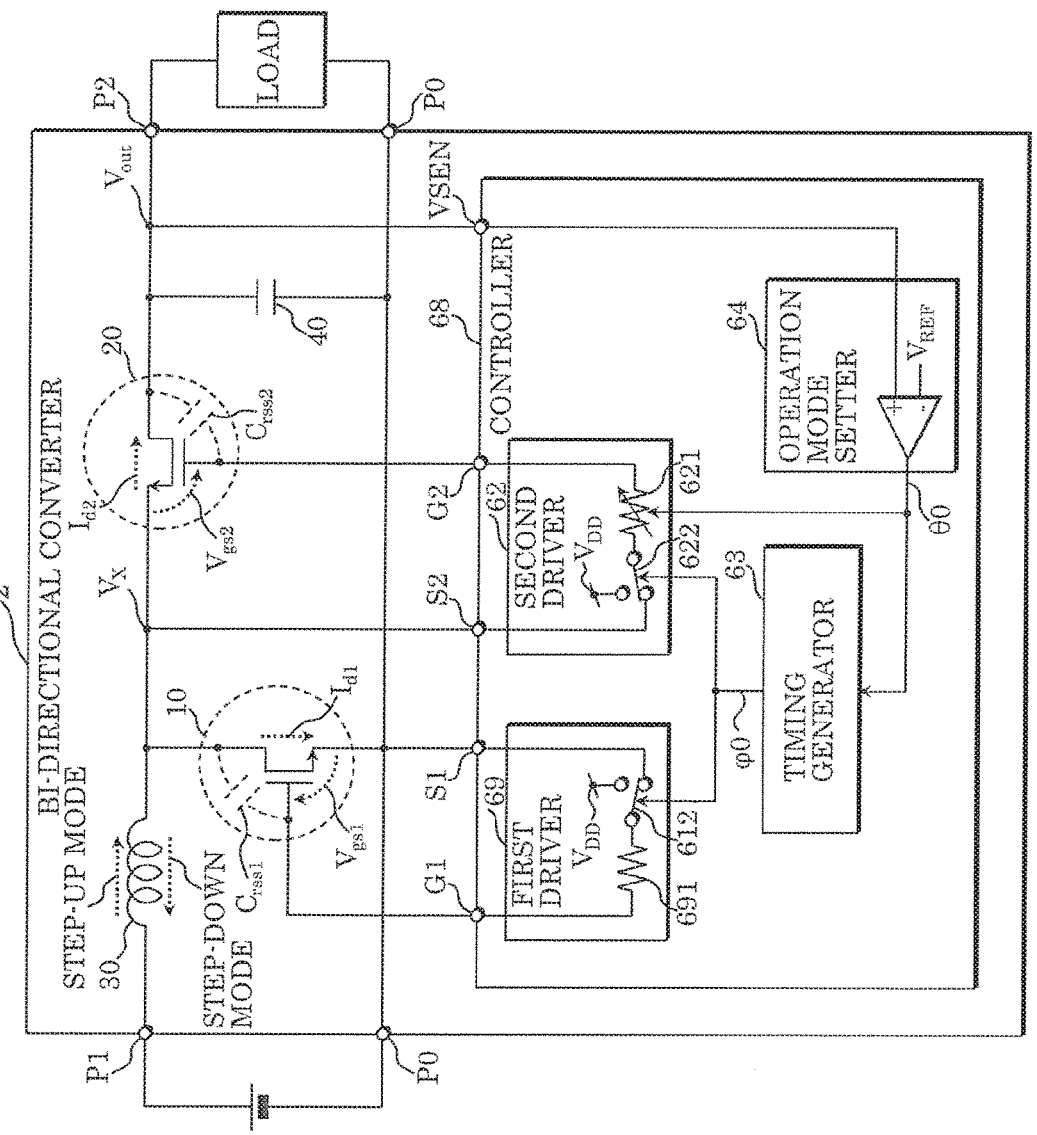
FIG. 15 is a circuit diagram illustrating an example of a functional configuration of a bi-directional converter according to Embodiment 2 of the present disclosure.

FIG. 15 is a block diagram illustrating an example of a functional configuration of bi-directional converter 2 according to Embodiment 2.

As illustrated in FIG. 15, bi-directional converter 2 is the same as bi-directional converter 1, except that first resistance circuit 691 of first driver 69 included in controller 68 is a fixed resistor.

Figure 16:
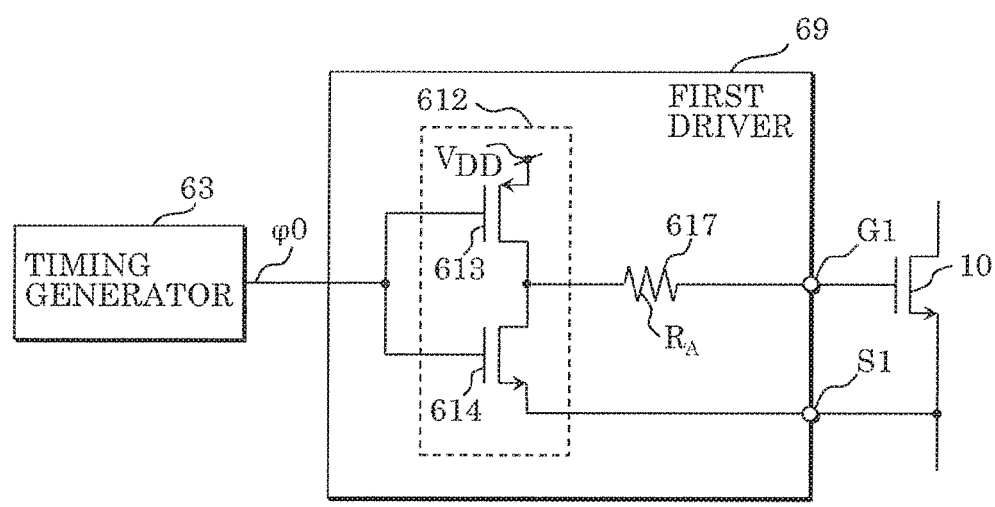
FIG. 16 is a circuit diagram illustrating an example of a configuration of a first driver according to Embodiment 2.

FIG. 16 is a circuit diagram illustrating a specific example of a circuit structure of first driver 69.

First driver 69 includes transistors 613 and 614, and resistance element 617.

Transistors 613 and 614 constitute an inverter and drive resistance element 617 in accordance with gate signal φ0. The resistance value of resistance element 617 may be great resistance value $R_A$ for the purposes of prevention of the self turn-on of second switching element 20 during a step-up operation, for example. Second driver 62 sets the gate resistance of second switching element 20 to a small value during the step-up operation, and countermeasure similar to as discussed above is thereby placed against self turn-on during the step-up operation.

In this case, however, a countermeasure against the self turn-on of first switching element 10 during a step-down operation is separately needed.

Figure 17:
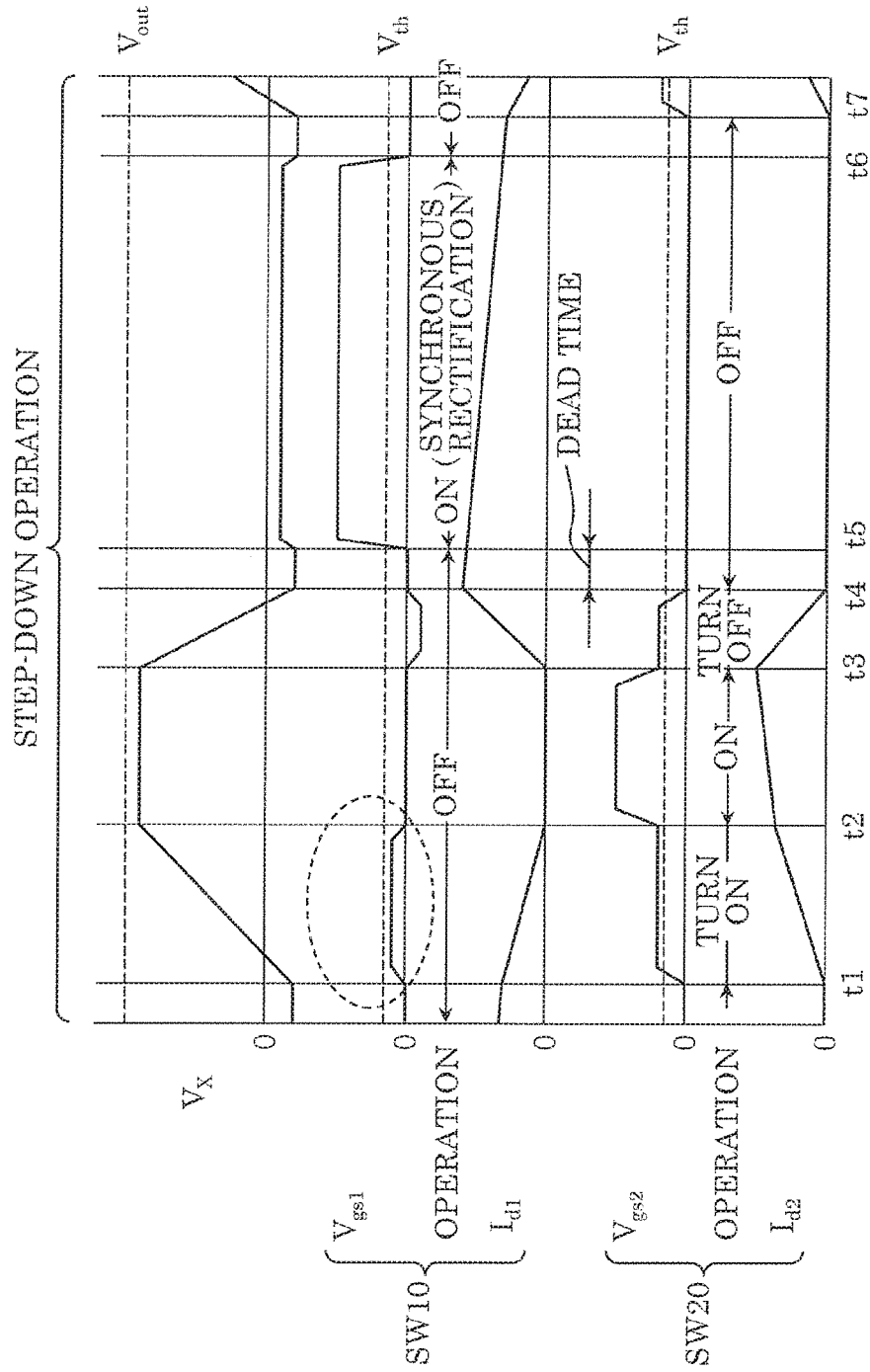
FIG. 17 is a waveform diagram illustrating an example of a step-down operation of the bi-directional converter according to Embodiment 2.

FIG. 17 is a waveform diagram illustrating changes in main signals during the step-down operation of bi-directional converter 2 over time, showing waveforms which constitute one cycle of the on-state and off-state of first switching element 20. During the step-down operation, transient gate current may be limited by significantly increasing the gate resistance of second switching element 20. This significantly reduces the slew rate value of voltage $V_X$, and thus the self turn-on of first switching element 10 during the step-down operation is avoided (see the dotted oval).

At this time, switching losses increase in the circuit. However, less frequency of reaching overvoltage, namely, less frequency of necessity of execution of the step-down operation provides a property of less degradation of the overall power conversion efficiency.

While first resistance circuit 691 included in first driver 69 is a fixed resistance circuit in the above, it should be noted that the second resistance circuit of the second driver may be a fixed resistance circuit. In other words, a bi-directional converter, in which at least one of the first resistance circuit and the second resistance circuit is a variable resistance circuit which has a resistance value that varies for the step-up operation and the step-down operation in accordance with operation mode signal θ0, is included in the present disclosure.

Other Embodiments

While first switching element 10 and second switching element 20 being N-channel MOSFETs have been described in the present disclosure, it should be noted that first switching element 10 and second switching element 20 are not limited to N-channel MOSFETs. For example, the first switching element and the second switching element may be P-channel MOSFETs.

Figure 18:
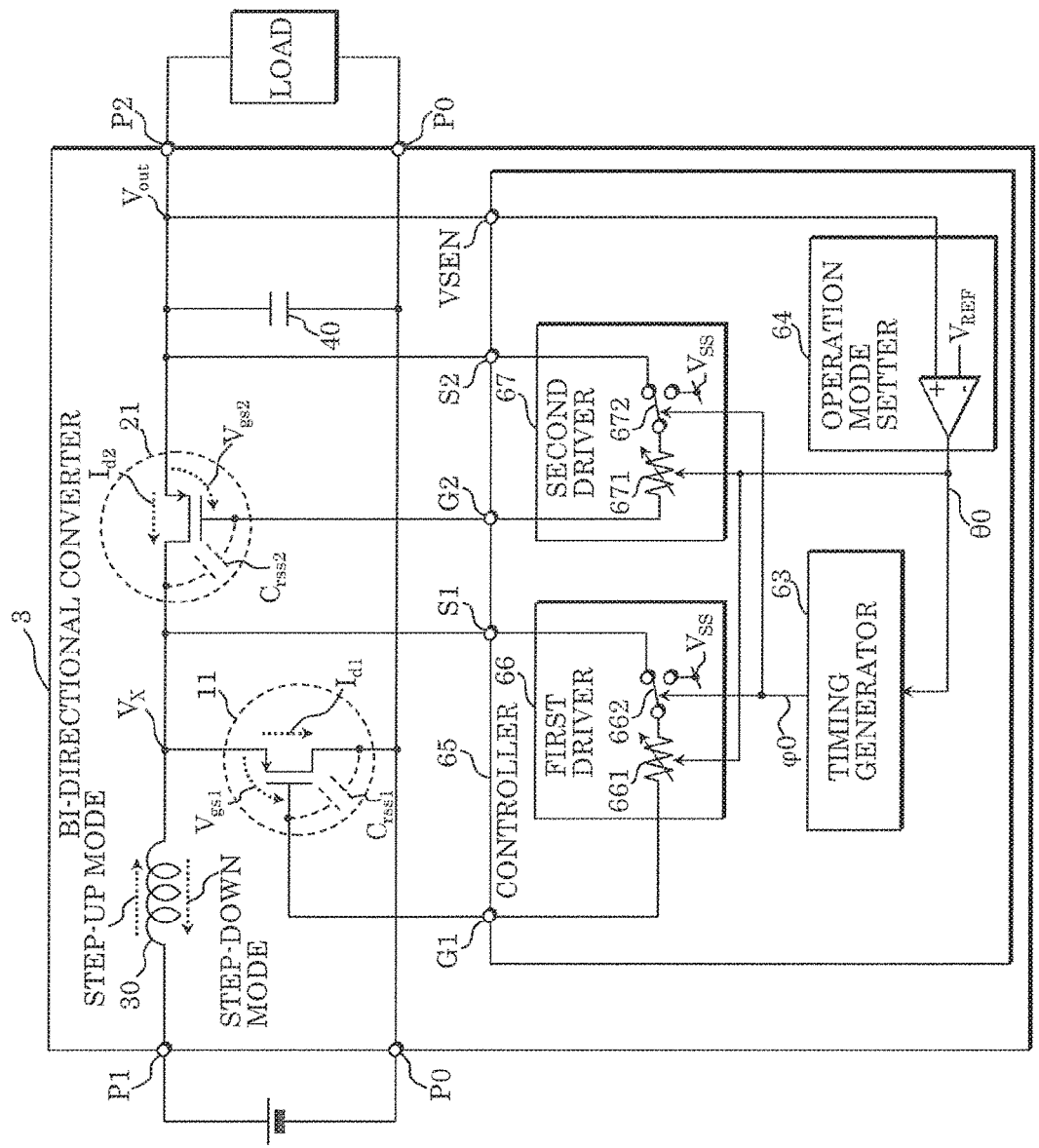
FIG. 18 is a circuit diagram illustrating an example of a functional configuration of a bi-directional converter according to a variation of Embodiment 1.

FIG. 18 is a circuit diagram illustrating an example of a bi-directional converter according to a variation of Embodiment 1.

As illustrated in FIG. 18, bi-directional converter 3 is the same as bi-directional converter 1, except that first switching element 11 and second switching element 21 are P-channel MOSFETs and controller 65 which is different from controller 60.

Controller 65 is different from controller 60 in the voltages that place first switching element 11 and second switching element 21 into the on-state and off-state. Specifically, first driver 66 includes first resistance circuit 661 and switch circuit 662 and second driver 67 includes second resistance circuit 671 and switch circuit 672. Difference similar to this difference has already been set forth with reference to bi-directional converter 8 (see FIG. 3) that is for describing the problems of the principle bi-directional converter. Thus, detailed description is omitted here.

Furthermore, the first switching element and the second switching element are not limited to MOSFETs, and are generally applicable to elements which have switching functionality, such as insulated gate bipolar transistors (IGBT) and high-electron-mobility transistors (HEMT).

Moreover, the materials of the first switching element and the second switching element are not limited to silicon semiconductors. Switching elements which includes semiconducting materials are increasing, such as a III-V wide bandgap transistor which includes GaN and SiC as semiconducting materials, a II-VI wide bandgap transistor which includes oxide such as ZnO, $TiO_2$, and $SnO_2$ as semiconducting materials. Not only the III-V and II-VI wide bandgap transistors, any switching elements that include semiconducting materials can be included.

Moreover, the controller described above may be implemented in a semiconductor device. For example, bi-directional converter 1 in FIG. 4 may include a printed circuit board on which first switching element 10, second switching element 20, inductor 30, and capacitor 40, which are discrete parts, and controller 60, which is an IC (integrated circuit) chip, are mounted. Such an IC chip is one example of a semiconductor device which controls the bi-directional converter.

An IC chip (hereinafter, a controller IC) as controller 60 has terminals for connecting to first switching element 10, second switching element 20, inductor 30, and capacitor 40. The controller IC may include, for example, first control output terminal G1 to be connected to the control terminal of first switching element 10, first interruption controlling voltage terminal S1 to be connected to the voltage source for placing first switching element 10 into the off-state, second control output terminal G2 to be connected to the control terminal of second switching element 20, and second interruption controlling voltage terminal S2 to be connected to the voltage source for placing second switching element 20 into the off-state. Furthermore, the controller IC may have voltage sensing terminal VSEN which obtains an electrical signal for detecting the voltage at second input/output terminal P2.

The controller IC includes therein at least circuits corresponding to first driver 61, second driver 62, and operation mode setter 64, and operates in response to supply of power from positive supply $V_{DD}$ and negative supply $V_{SS}$ that are not shown.

Here, when the first switching element and the second switching element are N-channel MOSFETs, positive supply $V_{DD}$ is used as the voltage source for controlling the on-state of the first switching element and the second switching element, and if they are P-channel MOSFETs negative supply $V_{SS}$ may be uses as the voltage source.

First driver 61 disposed within the controller IC includes first resistance circuit 611 and selectively connects first control output terminal G1, via first resistance circuit 611, to one of first interruption controlling voltage terminal S1 and the voltage source for placing the first switching element into the on-state.

Moreover, second driver 62 includes second resistance circuit 621 and selectively connects second control output terminal G2, via second resistance circuit 621, to one of second interruption controlling voltage terminal S2 and the voltage source for placing the second switching element into the on-state.

Moreover, operation mode setter 64 generates operation mode signal θ0 selectively indicating one of the step-up operation and the step-down operation.

Moreover, at least one of the first resistance circuit and the second resistance circuit is a variable resistance circuit which has a resistance value that varies for the step-up operation and the step-down operation in accordance with the operation mode signal. Although specific configuration of the variable resistance circuit is not limited, a combination of specific examples of first driver 61 and second driver 62 described in the embodiments may be used, for example.

According to the controller IC thus configured, the functionality of controller 60 can be integrated into a semiconductor device.

INDUSTRIAL APPLICABILITY

The bi-directional converter according to the present disclosure is applicable to devices which drive motors, solenoid valves, internal combustion engine injectors, etc., and voltage control device such as photoelectric conversion devices and devices which charges/discharges a secondary battery using power from a DC power supply.

What is claimed is:

1. A controller which controls a bi-directional converter, the bi-directional converter including: a first input/output terminal and a second input/output terminal, each for outputting at least one of a voltage stepped up by a step-up operation and a voltage stepped down by a step-down operation; a first switching element; a second switching element; and an inductor, the controller comprising:

a first driver which includes a first switching element and a first resistance circuit and controls the first switching element via the first resistance circuit;

a second driver which includes a second switching element and a second resistance circuit and controls the second switching element via the second resistance circuit; and an operation mode setter which selects one of the step-up operation and the step-down operation, wherein at least one of the first resistance circuit and the second resistance circuit includes a variable resistance circuit which has a resistance value that varies for the step-up operation and the step-down operation, in accordance with selection made by the operation mode setter.

2. The controller according to claim 1, wherein the operation mode setter compares a voltage at the second input/output terminal with a predetermined threshold voltage to generate an operation mode signal that indicates the step-up operation when the voltage at the second input/output terminal is the predetermined threshold voltage or less and generate an operation mode signal that indicates the step-down operation when the voltage at the second input/output terminal is greater than the predetermined threshold voltage.

3. The controller according to claim 2, wherein the operation mode setter outputs the operation mode signal to the first resistance circuit and the second resistance circuit.

4. The controller according to claim 1, wherein in the bi-directional converter, the inductor has a first end connected to the first input/output terminal, the first switching element switches between conduction and interruption between a second end of the inductor and a common terminal, and the second switching element switches between conduction and interruption between the second end of the inductor and the second input/output terminal, wherein the first resistance circuit includes a variable resistance circuit whose resistance value is smaller during the step-down operation than during the step-up operation.

5. The controller according to claim 1, wherein in the bi-directional converter, the inductor has a first end connected to the first input/output terminal, the first switching element switches between conduction and interruption between a second end of the inductor and a common terminal, and the second switching element switches between conduction and interruption between the second end of the inductor and the second input/output terminal, wherein the second resistance circuit includes a variable resistance circuit whose resistance value is smaller during the step-up operation than during the step-down operation.

6. The controller according to claim 1, wherein
at least one of the first resistance circuit and the second resistance circuit includes a plurality of switching elements which have predetermined resistance values during an on-state.

7. A bi-directional converter comprising:
the controller according to claim 1;
a first switching element controlled by the controller;
a second switching element controlled by the controller; and
an inductor.

8. The bi-directional converter according to claim 7, wherein
at least one of the first switching element and the second switching element is a field effect transistor.

9. The bi-directional converter according to claim 7, wherein
at least one of the first switching element and the second switching element is a III-V wide bandgap transistor or a II-VI wide bandgap transistor.

10. A controller which controls a bi-directional converter,
the bi-directional converter including: a first input/output terminal and a second input/output terminal, each for outputting at least one of a voltage stepped up by a step-up operation and a voltage stepped down by a step-down operation; a first switching element; a second switching element; and an inductor,
the controller comprising:
a first driver which controls the first switching element via a first resistance circuit;
a second driver which controls the second switching element via a second resistance circuit; and
an operation mode setter which selects one of the step-up operation and the step-down operation, wherein:
at least one of the first resistance circuit and the second resistance circuit includes a variable resistance circuit which has a resistance value that varies for the step-up operation and the step-down operation, in accordance with selection made by the operation mode setter, and
at least one of the first resistance circuit and the second resistance circuit includes a plurality of resistance elements having predetermined resistance values and a switching element which switches between connections to the plurality of resistance elements.

11. A semiconductor device which controls a bi-directional converter,
the bi-directional converter including a first switching element and a second switching element an on-state and an off-state of each of which are voltage controlled, and an inductor,
the semiconductor device comprising:
a first control output terminal connected to a control terminal of the first switching element;
a first interruption controlling voltage terminal connected to a voltage source for placing the first switching element into the off-state;
a second control output terminal connected to a control terminal of the second switching element;
a second interruption controlling voltage terminal connected to a voltage source for placing the second switching element into the off-state;
a first driver which includes a first switching element and a first resistance circuit and selectively connects the first control output terminal, via the first resistance circuit, to one of the first interruption controlling voltage terminal and a voltage source for placing the first switching element into the on-state;
a second driver which includes a second switching element and a second resistance circuit and selectively connects the second control output terminal, via the second resistance circuit, to one of the second interruption controlling voltage terminal and a voltage source for placing the second switching element into the on-state; and
an operation mode setter which generates an operation mode signal selectively indicating one of a step-up operation and a step-down operation, wherein
at least one of the first resistance circuit and the second resistance circuit is a variable resistance circuit which has a resistance value that varies for the step-up operation and the step-down operation, in accordance with the operation mode signal.

* * * * *